(12) United States Patent
Wu et al.

(10) Patent No.: US 12,531,666 B2
(45) Date of Patent: Jan. 20, 2026

(54) METHOD AND DEVICE IN NODES USED FOR WIRELESS COMMUNICATION

(71) Applicant: BUNKER HILL TECHNOLOGIES LLC, Allen, TX (US)

(72) Inventors: Keying Wu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 1099 days.

(21) Appl. No.: 17/529,284

(22) Filed: Nov. 18, 2021

(65) Prior Publication Data
US 2022/0077970 A1 Mar. 10, 2022

Related U.S. Application Data

(63) Continuation of application No. PCT/CN2020/094143, filed on Jun. 3, 2020, and a
(Continued)

(30) Foreign Application Priority Data

| May 21, 2019 | (CN) | .......................... 201910424700.6 |
| Jun. 21, 2019 | (CN) | .......................... 201910542799.X |

(51) Int. Cl.
*H04L 1/1829* (2023.01)
*H04L 5/00* (2006.01)
(Continued)

(52) U.S. Cl.
CPC .......... *H04L 1/1861* (2013.01); *H04L 5/0053* (2013.01); *H04W 72/20* (2023.01); *H04W 4/40* (2018.02)

(58) Field of Classification Search
CPC . H04L 1/1861; H04L 5/0053; H04L 27/2601; H04L 5/003; H04L 5/0051;
(Continued)

(56) References Cited

U.S. PATENT DOCUMENTS

| 11,923,984 B2 * | 3/2024 | Wu ....................... H04L 5/0055 |
| 2019/0052436 A1 | 2/2019 | Desai |

(Continued)

FOREIGN PATENT DOCUMENTS

| CN | 103391158 A | 11/2013 |
| CN | 108988983 A | 12/2018 |

(Continued)

OTHER PUBLICATIONS

Intel Corpora Tion. "Physica l layer procedures for NR V2X sidelink communication" 3GPP TSG RAN WGl Meeting #97 RI-1906799, May 17, 2019 (May 17, 2019).

(Continued)

*Primary Examiner* — Ivan O Latorre
(74) *Attorney, Agent, or Firm* — Ascenda Law Group, PC

(57) ABSTRACT

The disclosure provides a method and a device in a node used for wireless communication. A first node monitors a first-type signaling and a second-type signaling in a first time-frequency resource pool and a second time-frequency resource pool respectively, receives a first signaling, and transmits a first information block. The first signaling is used for determining the first information block; the first signaling includes a first field; when the first signaling is the first-type signaling, a value of the first field is related to a number of the first-type signalings transmitted in the first time-frequency resource pool, and is unrelated to a number of the second-type signalings transmitted in the second time-frequency resource pool. The above method improves the efficiency of HARQ feedback in sidelink transmission.

20 Claims, 12 Drawing Sheets

Related U.S. Application Data continuation of application No. PCT/CN2020/088862, filed on May 7, 2020.

(51) Int. Cl.
*H04W 4/40* (2018.01)
*H04W 72/20* (2023.01)

(58) Field of Classification Search
CPC ... H04L 5/0055; H04L 5/0057; H04L 5/0094; H04L 1/1614; H04L 1/1896; H04L 1/1819; H04L 1/1822; H04L 1/1893; H04W 72/20; H04W 4/40; H04W 92/18
See application file for complete search history.

(56) References Cited

U.S. PATENT DOCUMENTS

| | | | | |
|---|---|---|---|---|
| 2019/0380136 | A1* | 12/2019 | Zhang | H04L 1/08 |
| 2020/0076553 | A1* | 3/2020 | Wang | H04L 5/0051 |
| 2020/0077432 | A1* | 3/2020 | Xiong | H04L 1/1861 |
| 2020/0106566 | A1* | 4/2020 | Yeo | H04L 1/1812 |
| 2020/0120531 | A1* | 4/2020 | Qin | H04B 7/0695 |
| 2020/0413348 | A1* | 12/2020 | Ryu | H04W 52/241 |
| 2021/0050950 | A1* | 2/2021 | Zhou | H04L 1/1812 |
| 2021/0266106 | A1* | 8/2021 | Yan | H04L 1/1896 |
| 2021/0314109 | A1* | 10/2021 | Zhao | H04W 72/0446 |
| 2021/0345300 | A1* | 11/2021 | Selvanesan | H04W 72/0453 |
| 2021/0359791 | A1* | 11/2021 | Wu | H04L 1/1854 |
| 2022/0053515 | A1* | 2/2022 | Zhang | H04W 72/21 |
| 2022/0077970 | A1* | 3/2022 | Wu | H04L 1/1896 |
| 2022/0182976 | A1* | 6/2022 | Jiang | H04W 72/0453 |
| 2022/0256586 | A1* | 8/2022 | Zeng | H04L 1/1854 |
| 2022/0346085 | A1* | 10/2022 | Hu | H04L 5/0053 |
| 2022/0416981 | A1* | 12/2022 | Wu | H04L 5/0053 |
| 2023/0007657 | A1* | 1/2023 | Liu | H04L 5/0007 |
| 2023/0049739 | A1* | 2/2023 | Yang | H04L 5/0055 |
| 2023/0050088 | A1* | 2/2023 | Wu | H04W 24/08 |
| 2023/0198681 | A1* | 6/2023 | Zhang | H04W 72/11 370/330 |
| 2023/0305099 | A1* | 9/2023 | Thomas | G01S 5/14 |
| 2024/0163853 | A1* | 5/2024 | Liu | H04W 72/04 |

FOREIGN PATENT DOCUMENTS

| | | |
|---|---|---|
| CN | 109076561 A | 12/2018 |
| CN | 109644455 A | 4/2019 |
| CN | 109691146 A | 4/2019 |

OTHER PUBLICATIONS

Vivo. "Physical Layer Procedure for NR Sidelink" 3GPP TSG RAN WGI Meeting #97 RI-1906142, May 17, 2019 (May 17, 2019).
Fraunhofer HHI et al. "Physical Layer Procedures for NR V2X" 3GPP TSG RAN WGI #97 RI-1906653, May 17, 2019 (May 17, 2019).sections 1-5.
Xiaomi Communications. "oN support of HARQ for V2x communications" 3GPPTSGR ⅲ V WGI Meeting #94bis RI-1811420, Oct. 12, 2018 (Oct. 12, 2018).
RI-1903450Intel-eV2X_SL_LI_Procedure_(revRI-1902482):13GPP,(psfchANDinterfere)ANDPD<May 21, 2019.
ISR received in application No. PCT/CN2020/088862 dated Aug. 5, 2020.
ISR received in application No. PCT/CN2020/094143 dated Aug. 31, 2020.
CN201910424700.6 Notification to Grant Patent Right for Invention dated Aug. 4, 2021.
CN201910542799.X Notification to Grant Patent Right for Invention dated Aug. 25, 2021.
CN201910424700.6 1st Office Action dated May 07,2021.
CN201910542799.X 1st Office Action dated Jul. 02,2021.
CN201910424700.6 First Search Report dated Apr. 27,2021.
CN201910542799.X First Search Report dated Jun. 28,2021.

* cited by examiner

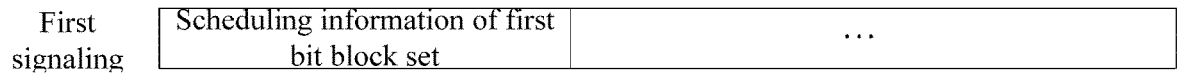
FIG. 7
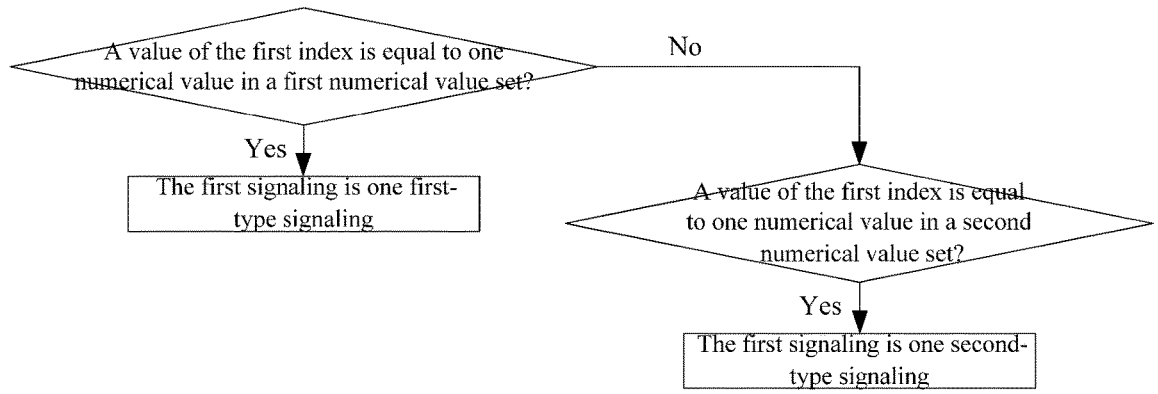
FIG. 8
FIG. 9
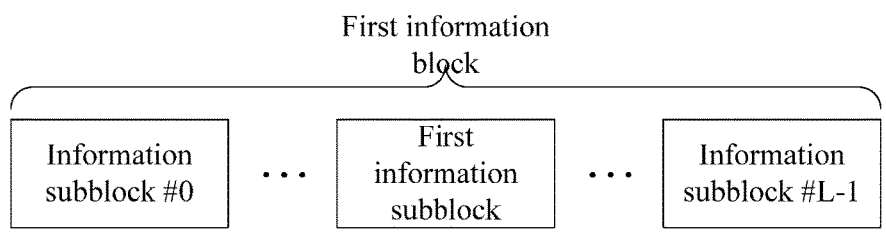
FIG. 10
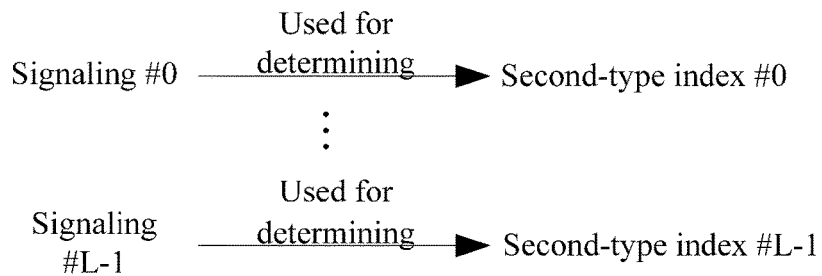
FIG. 11

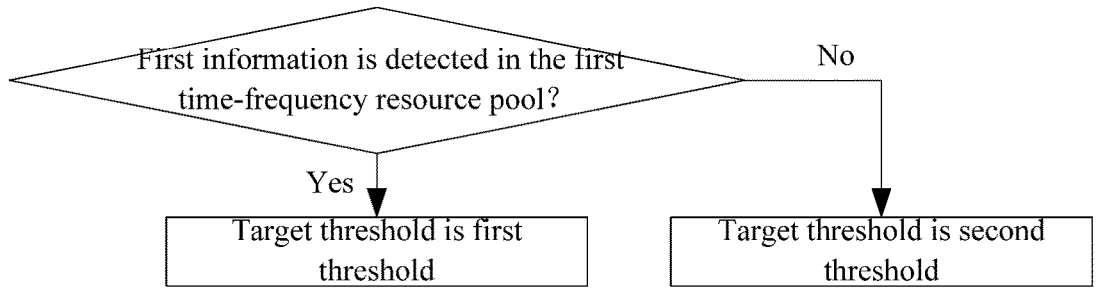
FIG. 21
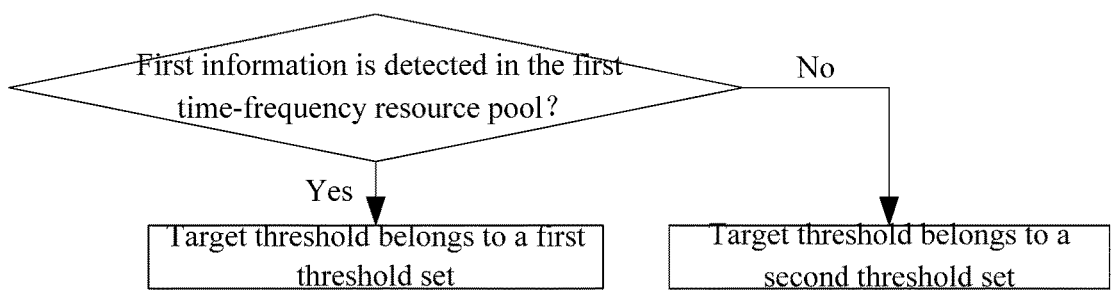
FIG. 22
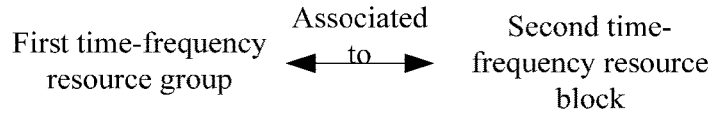
FIG. 23
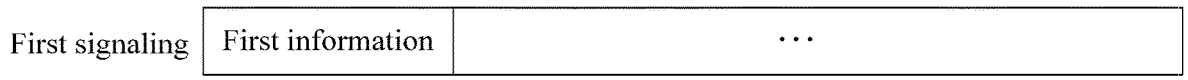
FIG. 24
FIG. 25
First signaling —Indicates→ First time-frequency resource group
FIG. 26

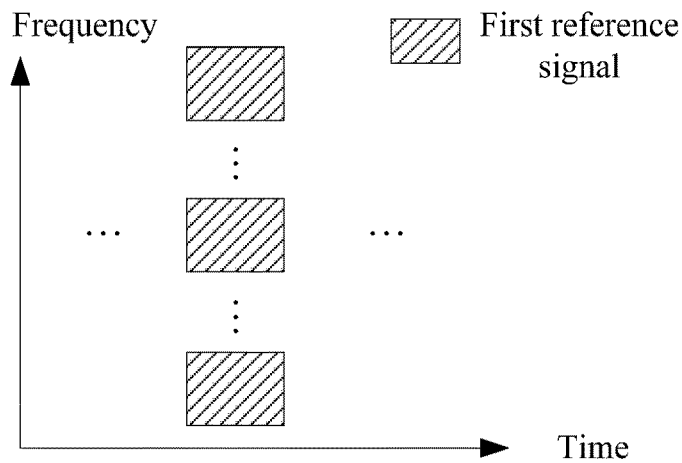
FIG. 27
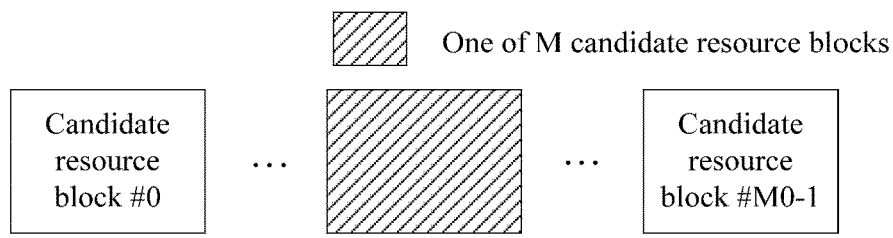
FIG. 28
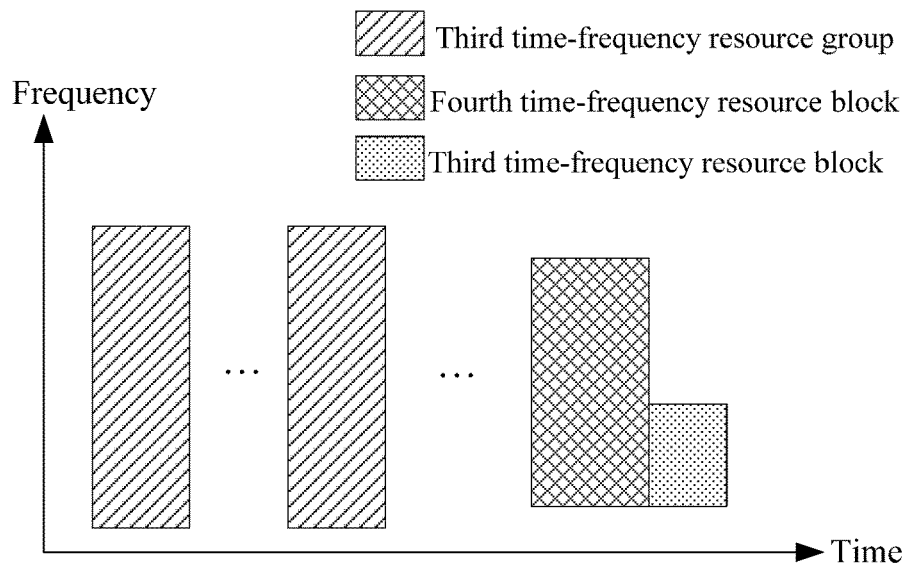
FIG. 29
FIG. 30

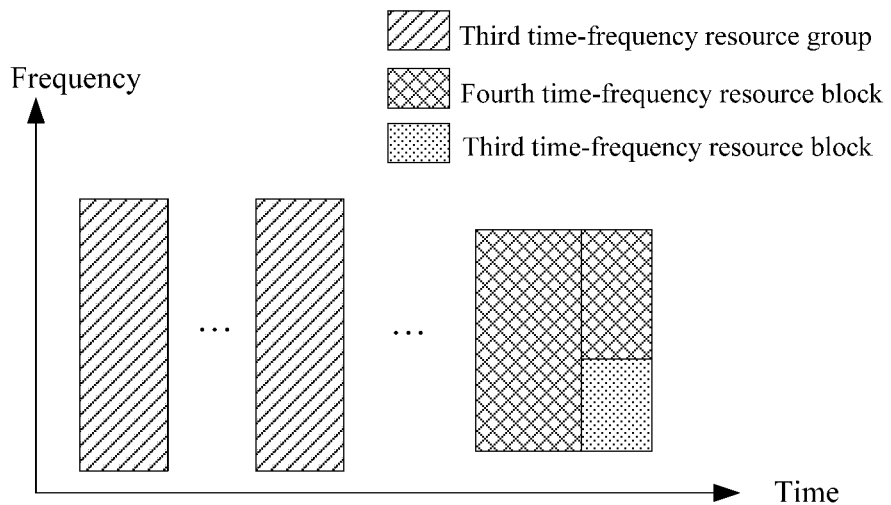
FIG. 31
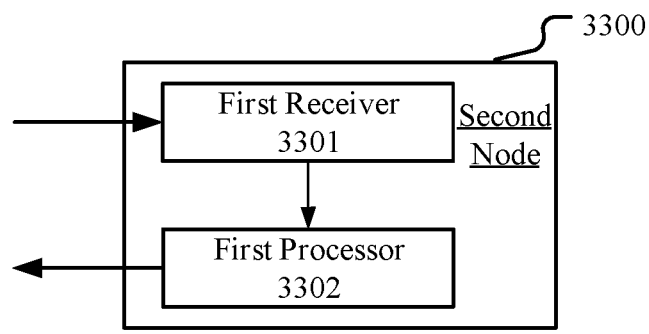
FIG. 32
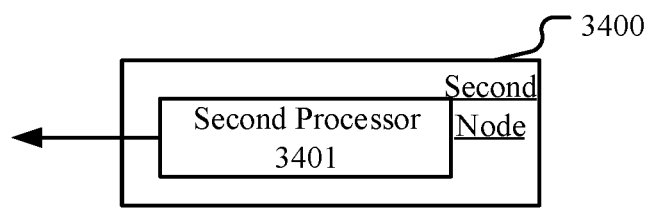
FIG. 33
FIG. 34

METHOD AND DEVICE IN NODES USED FOR WIRELESS COMMUNICATION

CROSS REFERENCE TO RELATED APPLICATIONS

This application is a continuation of International Application No. PCT/CN2020/088862, filed May 7, 2020, which is claims the priority benefit of Chinese Patent Application No. 201910424700.6, filed on May 21, 2019, and is a continuation of International Application No. PCT/CN2020/094143, filed Jun. 3, 2020, which is claim the priority benefit of Chinese Patent Application No. 201910542799.X, filed on Jun. 21, 2019, the full disclosure of which is incorporated herein by reference.

BACKGROUND

Technical Field

The disclosure relates to transmission methods and devices in wireless communication systems, and in particular to a method and device for transmission on sidelink in wireless communication.

BACKGROUND

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR) (or 5G). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The technical research of NR V2X was approved at the 3GPP RAN #80 session.

SUMMARY

Compared with existing Long-term Evolution (LTE) V2X systems, the NR V2X has a significant feature of supporting unicast and groupcast and supporting a Hybrid Automatic Repeat request (HARQ) function. A Physical Sidelink Feedback Channel (PSFCH) is introduced for the HARQ feedback on sidelink. According to the results of the 3GPP RAN1 #96b session, PSFCH resources will be periodically configured or preconfigured.

In LTE and NR systems, a Downlink Assignment Index (DAI) is employed to determine a HARQ feedback codebook in the transmission of cellular links, which improves the efficiency of HARQ feedback and avoids an inconsistent understanding of the HARQ feedback codebook between the two communication parties. The inventor finds through researches that the DAI in the transmission of sidelink needs a special design due to the particularity of sidelink. In view of the above problems, the disclosure provides a solution. It should be noted that the embodiments of the first node of the disclosure and the characteristics in the embodiments may be applied to the second node if no conflict is incurred, and vice versa. The embodiments of the disclosure and the characteristics in the embodiments may be mutually combined arbitrarily if no conflict is incurred.

In order to ensure the reliability of the HARQ feedback, in the NR V2X Mode 2, when a User Equipment (UE) selects resources to perform V2X transmission according to channel sensing, it is needed to consider the impacts to the PSFCH channel. In view of the above problems, the disclosure provides a solution. It should be noted that the embodiments of the first node of the disclosure and the characteristics in the embodiments may be applied to the second node if no conflict incurred, and vice versa. The embodiments of the disclosure and the characteristics in the embodiments may be mutually combined arbitrarily if no conflict is incurred.

The disclosure provides a method in a first node for wireless communication, wherein the method includes:
  monitoring a first-type signaling and a second-type signaling in a first time-frequency resource pool and a second time-frequency resource pool respectively, and receiving a first signaling; and
  transmitting a first information block.

Herein, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the problem to be solved by the preset disclosure includes: improving the efficiency of HARQ feedback in sidelink communication, and meanwhile avoiding a deviation of understanding of HARQ feedback between the two communication parties. The above method solves the above problem by providing a design scheme of DAI for sidelink communication.

In one embodiment, the above method is characterized in that: different counting methods are designed for DAIs in different types of signalings in sidelink communication In one embodiment, the above method is characterized in that: the first-type signaling schedules data of groupcast transmission, and the second-type signaling schedules data of unicast transmission. The DAI in the signaling scheduling data of groupcast transmission only counts the number of signalings scheduling data of groupcast transmission; and the DAI in the signaling scheduling data of unicast transmission counts both the number of signalings scheduling data of unicast transmission and the number of signalings scheduling data of groupcast transmission.

In one embodiment, the advantage of the above method includes: by taking full advantage of the characteristics of different types of data, the efficiency of HARQ feedback is improved without causing ambiguity.

According to one aspect of the disclosure, the method includes:
  receiving a first bit block set.

Herein, the first signaling includes scheduling information of the first bit block set; the first information block indicates whether each bit block in the first bit block set is correctly received.

According to one aspect of the disclosure, the first signaling is used for indicating a semi-persistent scheduling release, and the first information block indicates whether the first signaling is correctly received.

According to one aspect of the disclosure, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

According to one aspect of the disclosure, the first information block includes L information subblocks, L being a positive integer greater than 1; L signalings are one-to-one corresponding to the L information subblocks, the first signaling is one of the L signalings, and the first signaling is corresponding to a first information subblock among the L information subblocks.

In one embodiment, the advantage of the above method includes: HARQ feedbacks for different signalings may be multiplexed on one channel, thus improving the efficiency of HARQ feedback.

According to one aspect of the disclosure, the L signalings are used for determining L second-type indexes respectively, and all the L second-type indexes have a same value.

In one embodiment, the above method is characterized in that: the second-type index indicates a transmitter of the corresponding signaling. The advantage of the above method includes: only the HARQ feedbacks against one same transmitter can be counted together, which avoids ambiguity in the understanding of DAI and HARQ feedback.

According to one aspect of the disclosure, the method includes:
receiving (L−1) signaling(s) among the L signalings other than the first signaling.

According to one aspect of the disclosure, the first information block is transmitted on a first channel, and the first signaling is used for determining air interface resources occupied by the first channel.

According to one aspect of the disclosure, the first node is a UE.

According to one aspect of the disclosure, the first node is a relay node.

The disclosure provides a method in a second node for wireless communication, wherein the method includes:
transmitting a first signaling; and
receiving a first information block.

Herein, the first signaling is used for determining the first information block; a first time-frequency resource pool and a second time-frequency resource pool are reserved for a first-type signaling and a second-type signaling respectively; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

According to one aspect of the disclosure, the method includes:
transmitting a first bit block set.

Herein, the first signaling includes scheduling information of the first bit block set; the first information block indicates whether each bit block in the first bit block set is correctly received.

According to one aspect of the disclosure, the first signaling is used for indicating a semi-persistent scheduling release, and the first information block indicates whether the first signaling is correctly received.

According to one aspect of the disclosure, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

According to one aspect of the disclosure, the first information block includes L information subblocks, L being a positive integer greater than 1; L signalings are one-to-one corresponding to the L information subblocks, the first signaling is one of the L signalings, and the first signaling is corresponding to a first information subblock among the L information subblocks.

According to one aspect of the disclosure, the L signalings are used for determining L second-type indexes respectively, and all the L second-type indexes have a same value.

According to one aspect of the disclosure, the method includes:
transmitting (L3−1) signaling(s) among L3 signalings other than the first signaling.

Herein, L3 is a positive integer greater than 1 but not greater than the L, any one of the L3 signalings is one of the L signalings, and the first signaling is one of the L3 signalings.

According to one aspect of the disclosure, the first information block is transmitted on a first channel, and the first signaling is used for determining air interface resources occupied by the first channel.

According to one aspect of the disclosure, the second node is a UE.

According to one aspect of the disclosure, the second node is a relay node.

The disclosure provides a first node for wireless communication, wherein the first node includes:
a first receiver, to monitor a first-type signaling and a second-type signaling in a first time-frequency resource pool and a second time-frequency resource pool respectively, and to receive a first signaling; and
a first transmitter, to transmit a first information block.

Herein, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

The disclosure provides a second node for wireless communication, wherein the second node includes:
   a second transmitter, to transmit a first signaling; and
   a second receiver, to receive a first information block.

Herein, the first signaling is used for determining the first information block; a first time-frequency resource pool and a second time-frequency resource pool are reserved for a first-type signaling and a second-type signaling respectively; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

The disclosure provides a method in a first node for wireless communication, wherein the method includes:
   monitoring first information in a first time-frequency resource pool;
   performing channel sensing in a first time-frequency resource group, and obtaining a first measurement value; and
   when the first measurement value is greater than a target threshold, judging that a second time-frequency resource block does not belong to a first candidate resource block set; when the first measurement value is not greater than the target threshold, judging that the second time-frequency resource block belongs to the first candidate resource block set.

Herein, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

In one embodiment, the problem to be solved by the disclosure includes: how to design channel sensing and resource selection to reduce an interference to a PSFCH channel in the NR V2X Mode2. The above method solves this problem by selecting different power detection thresholds according to whether there is a PSFCH channel in the candidate resource.

In one embodiment, the above method is characterized in that: the second time-frequency resource block is one candidate resource, and the target threshold is used for judging whether the second time-frequency resource block needs to be excluded. The first node selects different target thresholds according to whether the second time-frequency resource block includes a PSFCH channel. The advantage of the above method is that: different protections are achieved for PSFCH and PSSCH (Physical Sidelink Shared Channel), which ensures a higher reliability of transmission of PSFCH.

According to one aspect of the disclosure, the first time-frequency resource group is related to whether the first information is detected in the first time-frequency resource pool.

In one embodiment, the above method is characterized in that: when the first information is detected in the first time-frequency resource pool, the first time-frequency resource group includes time-frequency resources occupied by the first transport block. The advantage of the above method is that: whether the candidate resource carrying a PSFCH is excluded is determined according to a receiving power of a PSSCH corresponding to a PSFCH, which improves the accuracy of channel sensing.

According to one aspect of the disclosure, the method includes:
   detecting a first signaling in the first time-frequency resource pool.

Herein, the first node detects the first information in the first time-frequency resource pool, and the first signaling carries the first information.

According to one aspect of the disclosure, the first signaling indicates the first time-frequency resource group; and the first transport block is transmitted in the first time-frequency resource group.

According to one aspect of the disclosure, a first reference signal is transmitted in the first time-frequency resource group; a measurement for the first reference signal is used for generating the first measurement value.

According to one aspect of the disclosure, the method includes:
   selecting M candidate resource block(s) in the first candidate resource block set, M being a positive integer; and
   transmitting a first signal in the M candidate resource block(s).

Herein, the first candidate resource block set includes M0 candidate resource block(s), any one of the M candidate resource block(s) is one of the M0 candidate resource block(s), and M0 is a positive integer not less than the M.

According to one aspect of the disclosure, the method includes:
   receiving second information.

Herein, the second information indicates that a second time-frequency resource group is reserved; the second time-frequency resource block is non-orthogonal to the second time-frequency resource group.

According to one aspect of the disclosure, the method includes:
   performing the channel sensing in a third time-frequency resource group, and obtaining a second measurement value; and
   when the second measurement value is greater than a third threshold, judging that a fourth time-frequency resource block does not belong to the first candidate resource block set; when the second measurement value is not greater than the third threshold, judging that the fourth time-frequency resource block belongs to the first candidate resource block set.

Herein, the first information is detected in the first time-frequency resource pool; the third time-frequency resource group belongs to the second time-frequency resource group, the fourth time-frequency resource block is non-orthogonal to the second time-frequency resource group; the third time-frequency resource block is orthogonal to the fourth time-frequency resource block in time-frequency domain.

In one embodiment, the above method is characterized in that: the fourth time-frequency resource block and the third time-frequency resource block include a part not carrying PSFCH and a part carrying PSFCH in one timeslot or subframe in time domain respectively. The advantage of the above method is that: the granularity of channel sensing and resource selection is reduced, and the utilization of resource is improved.

According to one aspect of the disclosure, the method includes:

receiving third information.

Herein, the third information is used for determining the first time-frequency resource pool.

According to one aspect of the disclosure, the first node is a UE.

According to one aspect of the disclosure, the first node is a relay node.

The disclosure provides a method in a second node for wireless communication, wherein the method includes:

transmitting first information in a first time-frequency resource pool, or giving up transmitting the first information in the first time-frequency resource pool.

Herein, the first information indicates that a third time-frequency resource block is reserved for first control information, the first control information is used for indicating whether a first transport block is correctly received, a second time-frequency resource block includes the third time-frequency resource block; a channel sensing performed in a first time-frequency resource group is used for determining a first measurement value; when the first measurement value is greater than a target threshold, the second time-frequency resource block is judged to not belong to a first candidate resource block set; when the first measurement value is not greater than the target threshold, the second time-frequency resource block is judged to belong to the first candidate resource block set; the target threshold is related to whether the first information is transmitted in the first time-frequency resource pool; the first time-frequency resource group is associated to the second time-frequency resource block.

According to one aspect of the disclosure, the first time-frequency resource group is related to whether the first information is transmitted in the first time-frequency resource pool.

According to one aspect of the disclosure, the method includes:

transmitting a first signaling in the first time-frequency resource pool.

Herein, the second node transmits the first information in the first time-frequency resource pool, and the first signaling carries the first information.

According to one aspect of the disclosure, the first signaling indicates the first time-frequency resource group; and the first transport block is transmitted in the first time-frequency resource group.

According to one aspect of the disclosure, the method includes:

transmitting a first reference signal in the first time-frequency resource group.

Herein, a measurement for the first reference signal is used for generating the first measurement value.

According to one aspect of the disclosure, the method includes:

transmitting second information.

Herein, the second information indicates that a second time-frequency resource group is reserved; the second time-frequency resource block is non-orthogonal to the second time-frequency resource group.

According to one aspect of the disclosure, the second node is a UE.

According to one aspect of the disclosure, the second node is a relay node.

The disclosure provides a first node for wireless communication, wherein the first node includes:

a first receiver, to monitor first information in a first time-frequency resource pool, perform channel sensing in a first time-frequency resource group and obtain a first measurement value; and a first processor, when the first measurement value is greater than a target threshold, to judge that a second time-frequency resource block does not belong to a first candidate resource block set; when the first measurement value is not greater than the target threshold, to judge that the second time-frequency resource block belongs to the first candidate resource block set.

Herein, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

The disclosure provides a second node for wireless communication, wherein the second node includes:

a second processor, to transmit first information in a first time-frequency resource pool, or give up transmitting the first information in the first time-frequency resource pool.

Herein, the first information indicates that a third time-frequency resource block is reserved for first control information, the first control information is used for indicating whether a first transport block is correctly received, a second time-frequency resource block includes the third time-frequency resource block; a channel sensing performed in a first time-frequency resource group is used for determining a first measurement value; when the first measurement value is greater than a target threshold, the second time-frequency resource block is judged to not belong to a first candidate resource block set; when the first measurement value is not greater than the target threshold, the second time-frequency resource block is judged to belong to the first candidate resource block set; the target threshold is related to whether the first information is transmitted in the first time-frequency resource pool; the first time-frequency resource group is associated to the second time-frequency resource block.

In one embodiment, compared with the conventional scheme, the disclosure has the following advantages.

The design of DAI in sidelink transmission is resolved.

The efficiency of HARQ feedback in sidelink transmission is improved.

The ambiguity in the understanding of DAI and HARQ feedback is avoided between the two communication parties in sidelink transmission.

In one embodiment, compared with the conventional scheme, the disclosure has the following advantages.

Different power detection thresholds are selected according to whether there is a PSFCH channel in the candidate resource, thus different protections are achieved for PSFCH and PSSCH, which ensures a higher reliability of transmission of PSFCH.

Whether the candidate resource carrying a PSFCH is excluded is determined according to a receiving power of a PSSCH corresponding to a PSFCH, which improves the accuracy of channel sensing.

The granularity of channel sensing and resource selection is reduced, and the utilization of resource is improved.

BRIEF DESCRIPTION OF THE DRAWINGS

Other features, purposes and advantages of the disclosure will become more apparent from the detailed description of non-restrictive embodiments taken in conjunction with the following drawings.

FIG. 7 is a diagram illustrating a first signaling according to one embodiment of the disclosure.

FIG. 8 is a diagram illustrating a first signaling according to one embodiment of the disclosure.

FIG. 9 is a diagram illustrating a first signaling and a first index according to one embodiment of the disclosure.

FIG. 10 is a diagram illustrating a first information block according to one embodiment of the disclosure.

FIG. 11 is a diagram illustrating L signalings and L second-type indexes according to one embodiment of the disclosure.

FIG. 21 is a diagram illustrating a scenario in which a target threshold is related to whether first information is detected in a first time-frequency resource pool according to one embodiment of the disclosure.

FIG. 22 is a diagram illustrating a scenario in which a target threshold is related to whether first information is detected in a first time-frequency resource pool according to one embodiment of the disclosure.

FIG. 23 is a diagram illustrating a scenario in which a first time-frequency resource group is associated to a second time-frequency resource block according to one embodiment of the disclosure.

FIG. 24 is a diagram illustrating a scenario in which a first time-frequency resource group is related to whether first information is detected in a first time-frequency resource pool according to one embodiment of the disclosure.

FIG. 25 is a diagram illustrating a first signaling and first information according to one embodiment of the disclosure.

FIG. 26 is a diagram illustrating a scenario in which a first signaling indicates a first time-frequency resource group according to one embodiment of the disclosure.

FIG. 27 is a diagram illustrating a first reference signal according to one embodiment of the disclosure.

FIG. 28 is a diagram illustrating a first candidate resource block set and M candidate resource blocks according to one embodiment of the disclosure.

FIG. 29 is a diagram illustrating second information and a second time-frequency resource group according to one embodiment of the disclosure.

FIG. 30 is a diagram illustrating a third time-frequency resource group, a fourth time-frequency resource block and a third time-frequency resource block according to one embodiment of the disclosure.

FIG. 31 is a diagram illustrating a third time-frequency resource group, a fourth time-frequency resource block and a third time-frequency resource block according to one embodiment of the disclosure.

FIG. 32 is a diagram illustrating third information according to one embodiment of the disclosure.

FIG. 33 is a structure block diagram illustrating a processing device in a first node equipment according to one embodiment of the disclosure.

FIG. 34 is a structure block diagram illustrating a processing device in a second node equipment according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
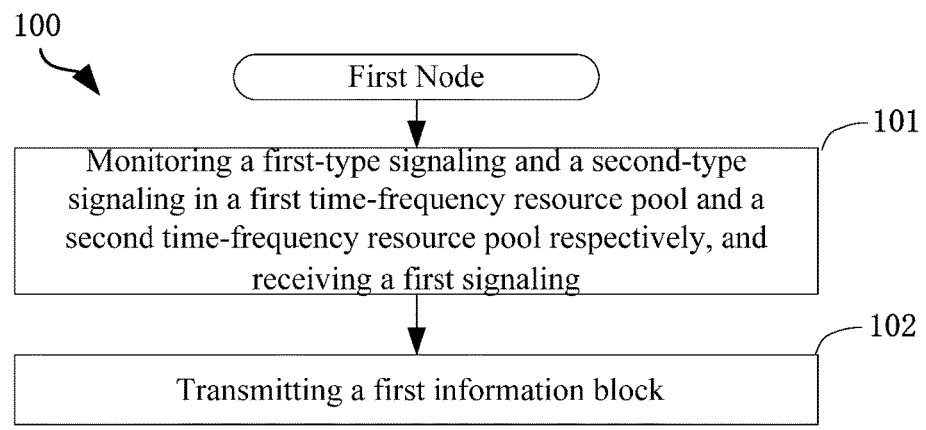
FIG. 1 is a flowchart of a first-type signaling, a second-type signaling, a first signaling and a first information block according to one embodiment of the disclosure.

Embodiment 1 illustrates a flowchart of a first-type signaling, a second-type signaling, a first signaling and a first information block according to one embodiment of the disclosure, as shown in FIG. 1. In 100 shown in FIG. 1, each box represents one step. In particular, the order of each step in the box does not represent the relationship in time precedence between the steps.

In Embodiment 1, the first node in the disclosure monitors a first-type signaling and a second-type signaling in a first time-frequency resource pool and a second time-frequency resource pool respectively and receives a first signaling in S101, and transmits a first information block in S102. Herein, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the first signaling is one first-type signaling or one second-type signaling.

In one embodiment, the first signaling is one first-type signaling.

In one embodiment, the first signaling is one second-type signaling.

In one embodiment, when the first signaling is one first-type signaling, the first signaling is received in the first time-frequency resource pool.

In one embodiment, when the first signaling is one second-type signaling, the first signaling is received in the second time-frequency resource pool.

In one embodiment, the monitoring refers to a reception based on energy detection, that is, sensing energies of radio signals and averaging the energies to obtain a received energy; if the received energy is greater than a second given threshold, it is judged that a signaling is received, otherwise, it is judged that no signaling is received.

In one embodiment, the monitoring refers to a coherent reception, that is, performing a coherent reception and measuring an energy of a signal obtained after the coherent reception; if the energy of the signal obtained after the coherent reception is greater than a first given threshold, it is judged that a signaling is received, otherwise, it is judged that no signaling is received.

In one embodiment, the monitoring refers to a blind decoding, that is, receiving a signal and performing a decoding operation; if the decoding is determined to be correct according to CRC bits, it is judged that a signaling is received, otherwise, it is judged that no signaling is received.

In one embodiment, the phrase of monitoring a first-type signaling and a second-type signaling in a first time-frequency resource pool and a second time-frequency resource pool respectively includes: the first node determines according to CRC whether the first-type signaling is transmitted in the first time-frequency resource pool, and the first node determines according to CRC whether the second-type signaling is transmitted in the second time-frequency resource pool.

In one embodiment, the phrase of monitoring a first-type signaling and a second-type signaling in a first time-frequency resource pool and a second time-frequency resource pool respectively includes: the first node performs blind decoding in the first time-frequency resource pool to determine whether the first-type signaling is transmitted, and the first node performs blind decoding in the second time-frequency resource pool to determine whether the second-type signaling is transmitted.

In one embodiment, the first-type signaling is unicast transmission.

In one embodiment, the first-type signaling is groupcast transmission.

In one embodiment, the first-type signaling is broadcast transmission.

In one embodiment, the first-type signaling is a dynamic signaling.

In one embodiment, the first-type signaling is a Layer 1 (L1) signaling.

In one embodiment, the first-type signaling is a Layer 1 (L1) control signaling.

In one embodiment, the first-type signaling includes one or more fields in one Sidelink Control Information (SCI).

In one embodiment, the first-type signaling includes one or more fields in one Downlink Control Information (DCI).

In one embodiment, the first-type signaling is transmitted on a sidelink.

In one embodiment, the first-type signaling is transmitted through a PC5 interface.

In one embodiment, the second-type signaling is unicast transmission.

In one embodiment, the second-type signaling is groupcast transmission.

In one embodiment, the second-type signaling is broadcast transmission.

In one embodiment, the second-type signaling is a dynamic signaling.

In one embodiment, the second-type signaling is a Layer 1 (L1) signaling.

In one embodiment, the second-type signaling is a Layer 1 (L1) control signaling.

In one embodiment, the second-type signaling includes one or more fields in one SCI.

In one embodiment, the second-type signaling includes one or more fields in one DCI.

In one embodiment, the second-type signaling is transmitted on a sidelink.

In one embodiment, the second-type signaling is transmitted through a PC5 interface.

In one embodiment, the first-type signaling includes a signaling used for indicating a Semi-Persistent Scheduling (SPS) release.

In one embodiment, the first-type signaling includes a signaling used for indicating configuration information of a PSSCH.

In one embodiment, the first-type signaling includes a signaling used for PSSCH scheduling.

In one embodiment, the second-type signaling includes a signaling used for indicating an SPS release.

In one embodiment, the second-type signaling includes a signaling used for indicating configuration information of a PSSCH.

In one embodiment, the second-type signaling includes a signaling used for PSSCH scheduling.

In one embodiment, the first-type signaling includes a signaling used for scheduling a PSSCH of groupcast transmission, and the second-type signaling includes a signaling used for scheduling a PSSCH of unicast transmission.

In one embodiment, the first-type signaling includes a signaling used for scheduling a PSSCH of unicast transmission, and the second-type signaling includes a signaling used for scheduling a PSSCH of groupcast transmission.

In one embodiment, the first-type signaling includes a signaling used for scheduling a PSSCH of groupcast transmission, and the second-type signaling includes a signaling used for scheduling a PSSCH of groupcast transmission.

In one embodiment, the first-type signaling includes a signaling used for scheduling a PSSCH of unicast transmission, and the second-type signaling includes a signaling used for scheduling a PSSCH of unicast transmission.

In one embodiment, any first-type signaling and any second-type signaling correspond to different signaling formats.

In one embodiment, a signaling format corresponding to one first-type signaling is one of P1 signaling format(s), a signaling format corresponding to one second-type signaling is one of P2 signaling format(s), any one of the P1 signaling format(s) does not belong to the P2 signaling format(s), any one of the P2 signaling format(s) does not belong to the P1 signaling format(s), P1 and P2 are positive integers respectively.

In one embodiment, when a signaling format of the first signaling belongs to P1 signaling format(s), the first signaling is one first-type signaling; when a signaling format of the first signaling belongs to P2 signaling format(s), the first signaling is one second-type signaling. Any one of the P1 signaling format(s) does not belong to the P2 signaling format(s), any one of the P2 signaling format(s) does not belong to the P1 signaling format(s), P1 and P2 are positive integers respectively.

In one embodiment, there is one first-type signaling corresponding to a same signaling format as one second-type signaling.

In one embodiment, the signaling format includes a DCI format.

In one embodiment, the signaling format includes an SCI format.

In one embodiment, any two first-type signalings have a same transmitter.

In one embodiment, a transmitter of any one first-type signaling is a transmitter of the first signaling.

In one embodiment, there are two first-type signalings having different transmitters.

In one embodiment, any two second-type signalings have a same transmitter.

In one embodiment, a transmitter of any one second-type signaling is a transmitter of the first signaling.

In one embodiment, there are two second-type signalings having different transmitters.

In one embodiment, any first-type signaling and any second-type signaling have a same transmitter.

In one embodiment, there is a first-type signaling having a different transmitter than one second-type signaling.

In one embodiment, the first signaling is unicast transmission.

In one embodiment, the first signaling is groupcast transmission.

In one embodiment, the first signaling is broadcast transmission.

In one embodiment, the first signaling is a dynamic signaling.

In one embodiment, the first signaling is a Layer 1 (L1) signaling.

In one embodiment, the first signaling is a Layer 1 (L1) control signaling.

In one embodiment, the first signaling includes an SCI.

In one embodiment, the first signaling includes one or more fields in one SCI.

In one embodiment, the first signaling includes an DCI.

In one embodiment, the first signaling includes one or more fields in one DCI.

In one embodiment, the first signaling is transmitted on a sidelink.

In one embodiment, the first signaling is transmitted through a PC5 interface.

In one embodiment, the first signaling includes a signaling used for indicating an SPS release.

In one embodiment, the first signaling includes a signaling used for indicating a DL (Downlink) release.

In one embodiment, the first signaling includes a signaling used for indicating an SL (Sidelink) release.

In one embodiment, the first signaling includes a signaling used for indicating configuration information of a PSSCH.

In one embodiment, the first signaling includes a signaling used for PSSCH scheduling.

In one embodiment, the first signaling includes a signaling used for scheduling a PSSCH of groupcast transmission.

In one embodiment, the first signaling includes a signaling used for scheduling a PSSCH of unicast transmission.

In one embodiment, the first field includes a positive integer number of bits.

In one embodiment, the first field includes two bits.

In one embodiment, the first field includes four bits.

In one embodiment, the first field is a Downlink assignment index field.

In one embodiment, the first field includes part or all information in a Downlink assignment index field.

In one embodiment, the first field in the first signaling is used for determining the first information block.

In one embodiment, the first field in the first signaling is used for determining a number of information bits included in the first information block.

In one embodiment, the first field in the first signaling indicates a number of information bits included in the first information block.

In one embodiment, the first field in the first signaling indicates that part information bits in the first information block should be set to 0.

In one embodiment, the first field in the first signaling indicates that part information bits in the first information block should be set to NACK.

In one embodiment, the first information block is unrelated to the first field in the first signaling.

In one embodiment, a number of information bits included in the first information block is unrelated to the first field in the first signaling.

In one embodiment, the first information block includes Hybrid Automatic Repeat reQuest-Acknowledgement (HARQ-ACK).

In one embodiment, the first information block includes Channel State Information (CSI).

In one embodiment, the first information block includes a Scheduling Request (SR).

In one embodiment, the first information block is transmitted on a sidelink.

In one embodiment, the first information block is transmitted through a PC5 interface.

In one embodiment, air interface resources occupied by a physical layer channel carrying the first information block are unrelated to the first signaling.

In one embodiment, air interface resources occupied by a physical layer channel carrying the first information block are unrelated to time-frequency resources occupied by the first signaling.

In one embodiment, the air interface resources include time domain resources and frequency domain resources.

In one embodiment, the air interface resources include time domain resources, frequency domain resources and code domain resources.

In one embodiment, when the first signaling is one second-type signaling, a value of the first field in the first signaling is related to a summation of a number of the first-type signalings transmitted in the first time-frequency resource pool and a number of the second-type signalings transmitted in the second time-frequency resource pool.

In one embodiment, a number of the first-type signalings transmitted in the first time-frequency resource pool is a non-negative integer.

In one embodiment, a number of the second-type signalings transmitted in the second time-frequency resource pool is a non-negative integer.

In one embodiment, a value of the first field in the first signaling indicates a number of the first-type signalings transmitted in the first time-frequency resource pool, and the first signaling is one first-type signaling.

In one embodiment, a value of the first field in the first signaling indicates a number of the second-type signalings transmitted in the second time-frequency resource pool, and the first signaling is one second-type signaling.

In one embodiment, a value of the first field in the first signaling indicates a summation of a number of the first-type signalings transmitted in the first time-frequency resource pool and a number of the second-type signalings transmitted in the second time-frequency resource pool, and the first signaling is one second-type signaling.

Embodiment 2

Figure 2:
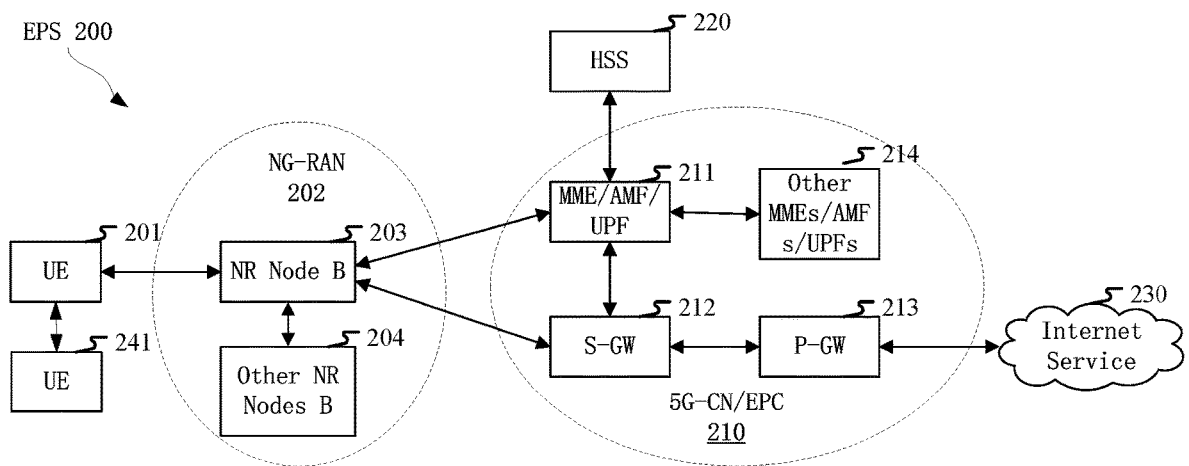
FIG. 2 is a diagram illustrating a network architecture according to one embodiment of the disclosure.

Embodiment 2 illustrates a diagram of a network architecture according to one embodiment of the disclosure, as shown in FIG. 2.

FIG. 2 illustrates a network architecture 200 of Long-Term Evolution (LTE), Long-Term Evolution Advanced (LTE-A) and future 5G systems. The network architecture 200 of the LTE, LTE-A and future 5G systems may be called an Evolved Packet System (EPS) 200. The EPS 200 may include one or more UEs 201, one UE 241 in sidelink communication with the UE 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN 202 includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the first node in the disclosure includes the UE 201.

In one embodiment, the first node in the disclosure includes the UE 241.

In one embodiment, the second node in the disclosure includes the UE 241.

In one embodiment, the second node in the disclosure includes the UE 201.

In one embodiment, the second node in the disclosure includes the gNB 203.

In one embodiment, an air interface between the UE 201 and the gNB 203 is a Uu interface.

In one embodiment, a radio link between the UE 201 and the gNB 203 is a cellular link.

In one embodiment, an air interface between the UE 201 and the UE 241 is a PC-5 interface.

In one embodiment, a radio link between the UE 201 and the UE 241 is a sidelink.

In one embodiment, the first node in the disclosure and the second node in the disclosure are one terminal in the coverage of the gNB 203 respectively.

In one embodiment, the first node in the disclosure is one terminal in the coverage of the gNB 203, and the second node in the disclosure is one terminal out of the coverage of the gNB 203.

In one embodiment, the first node in the disclosure is one terminal out of the coverage of the gNB 203, and the second node in the disclosure is one terminal in the coverage of the gNB 203.

In one embodiment, the first node in the disclosure and the second node in the disclosure are one terminal out of the coverage of the gNB 203 respectively.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, a transmitter of the first signaling in the disclosure includes the UE 241.

In one embodiment, a receiver of the first signaling in the disclosure includes the UE 201.

In one embodiment, a transmitter of the first signaling in the disclosure includes the UE 201.

In one embodiment, a receiver of the first signaling in the disclosure includes the UE 241.

In one embodiment, a transmitter of the first information block in the disclosure includes the UE 201.

In one embodiment, a receiver of the first information block in the disclosure includes the UE 241.

In one embodiment, a transmitter of the first information block in the disclosure includes the UE 241.

In one embodiment, a receiver of the first information block in the disclosure includes the UE 201.

In one embodiment, a transmitter of the first information in the disclosure includes the UE 201.

In one embodiment, a receiver of the first information in the disclosure includes the UE 241.

In one embodiment, a transmitter of the first information in the disclosure includes the UE 241.

In one embodiment, a receiver of the first information in the disclosure includes the UE 201.

Embodiment 3

Figure 3:
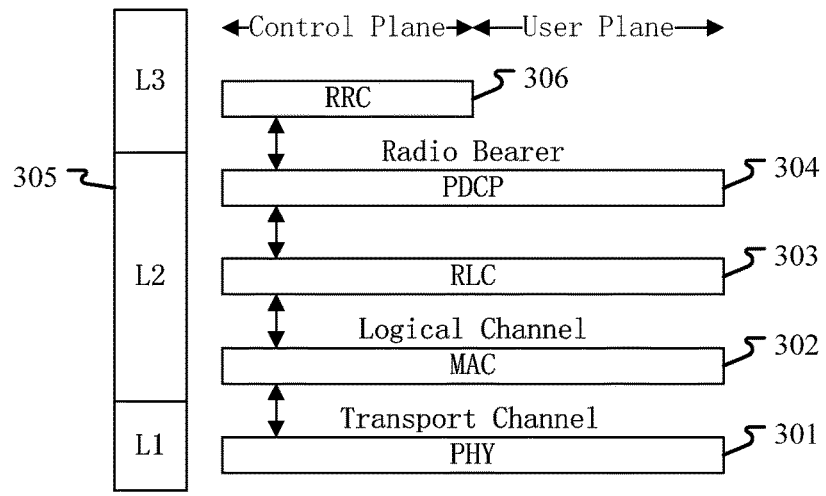
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to one embodiment of the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first-type signaling in the disclosure is generated on the PHY 301.

In one embodiment, the first-type signaling in the disclosure is generated on the MAC sublayer 302.

In one embodiment, the second-type signaling in the disclosure is generated on the PHY 301.

In one embodiment, the second-type signaling in the disclosure is generated on the MAC sublayer 302.

In one embodiment, the first signaling in the disclosure is generated on the PHY 301.

In one embodiment, the first signaling in the disclosure is generated on the MAC sublayer 302.

In one embodiment, the first information block in the disclosure is generated on the PHY 301.

In one embodiment, the first bit block set in the disclosure is generated on the PHY 301.

In one embodiment, the first bit block set in the disclosure is generated on the MAC sublayer 302.

In one embodiment, the first bit block set in the disclosure is generated on the RRC sublayer 306.

In one embodiment, one of the L signalings in the disclosure is generated on the PHY 301.

In one embodiment, one of the L signalings in the disclosure is generated on the MAC sublayer 302.

In one embodiment, the first information in the disclosure is generated on the PHY 301.

In one embodiment, the first information in the disclosure is generated on the MAC sublayer 302.

In one embodiment, the first reference signal in the disclosure is generated on the PHY 301.

In one embodiment, the first signal in the disclosure is generated on the PHY 301.

In one embodiment, the second information in the disclosure is generated on the PHY 301.

In one embodiment, the second information in the disclosure is generated on the MAC sublayer 302.

In one embodiment, the third information in the disclosure is generated on the RRC sublayer 306.

Embodiment 4

Figure 4:
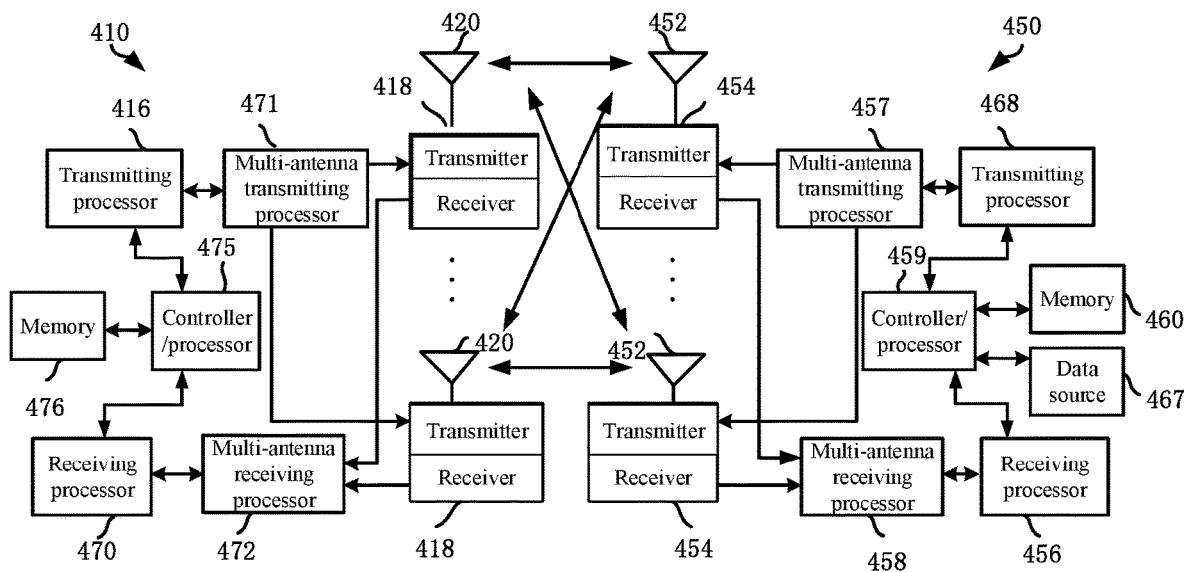
FIG. 4 is a diagram illustrating a first communication equipment and a second communication equipment according to one embodiment of the disclosure.

Embodiment 4 illustrates a diagram of a first communication equipment and a second communication equipment according to one embodiment of the disclosure, as shown in FIG. 4. FIG. 4 is a block diagram of a second communication equipment 450 and a first communication equipment 410 that are in communication with each other in an access network.

The first communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication equipment 410 to the second communication equipment 450, at the first communication equipment 410, a higher-layer packet from a core network is provided to the controller/processor 475. The controller/processor 475 provides functions of Layer 2. In DL, the controller/processor 475 provides header compression, encryption, packet segmentation and reordering, multiplexing between a logical channel and a transport channel, and a radio resource allocation for the second communication equipment 450 based on various priority metrics. The controller/processor 475 is also in charge of HARQ operation, retransmission of lost packets, and signalings to the second communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 450 and constellation mappings corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the first communication equipment 410 to the second communication equipment 450, at the second communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the first communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In a transmission from the second communication equipment 450 to the first communication equipment 410, at the second communication equipment 450, the data source 467 provides a higher-layer packet to the controller/processor 459. The data source 467 illustrates all protocol layers above the L2 layer. Similar as the transmitting function of the first communication equipment 410 described in DL, the controller/processor 459 provides header compression, encryption, packet segmentation and reordering, and multiplexing between a logical channel and a transport channel based on radio resource allocation of the first communication equipment 410 so as to provide the functions of L2 layer used for the control plane and user plane. The controller/processor 459 is also in charge of HARQ operation, retransmission of lost packets, and signalings to the first communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the second communication equipment 450 to the first communication equipment 410, the function of the first communication equipment 410 is similar as the receiving function of the second communication equipment 450 described in the transmission from first communication equipment 410 to the second communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. The controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the second communication equipment 450 includes at least one processor and at least one memory. The at least one memory includes computer program codes. The at least one memory and the computer program codes are configured to be used in collaboration with the at least one processor. The second communication equipment 450 at least monitors the first-type signaling and the second-type signaling in the disclosure in the first time-frequency resource pool and the second time-frequency resource pool in the disclosure respectively, receives the first signaling in the disclosure, and transmits the first information block in the disclosure. Herein, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the second communication equipment 450 includes a memory that stores a computer readable instruction program. The computer readable instruction program generates an action when executed by at least one processor. The action includes: monitoring the first-type signaling and the second-type signaling in the disclosure in the first time-frequency resource pool and the second time-frequency resource pool in the disclosure respectively, receiving the first signaling in the disclosure, and transmitting the first information block in the disclosure. Herein, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the first communication equipment 410 includes at least one processor and at least one memory. The at least one memory includes computer program codes. The at least one memory and the computer program codes are configured to be used in collaboration with the at least one processor. The first communication equipment 410 at least transmits the first signaling in the disclosure and receives the first information block in the disclosure. Herein, the first signaling is used for determining the first information block; a first time-frequency resource pool and a second time-frequency resource pool are reserved for a first-type signaling and a second-type signaling respectively; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the first communication equipment 410 includes a memory that stores a computer readable instruction program. The computer readable instruction program generates an action when executed by at least one processor. The action includes: transmitting the first signaling in the disclosure and receiving the first information block in the disclosure. Herein, the first signaling is used for determining the first information block; a first time-frequency resource pool and a second time-frequency resource pool are reserved for a first-type signaling and a second-type signaling respectively; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the second communication equipment 450 includes at least one processor and at least one memory. The at least one memory includes computer program codes. The at least one memory and the computer program codes are configured to be used in collaboration with the at least one processor. The second communication equipment 450 at least monitors the first information in the disclosure in the first time-frequency resource pool in the disclosure, performs the channel sensing in the disclosure in the first time-frequency resource group in the disclosure, and obtains the first measurement value in the disclosure; and when the first measurement value is greater than a target threshold, judges that the second time-frequency resource block in the disclosure does not belong to the first candidate resource block set in the disclosure; when the first measurement value is not greater than the target threshold, judges that the second time-frequency resource block belongs to the first candidate resource block set. Herein, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

In one embodiment, the second communication equipment 450 includes a memory that stores a computer readable instruction program. The computer readable instruction program generates an action when executed by at least one processor. The action includes: monitoring the first information in the disclosure in the first time-frequency resource pool in the disclosure, performing the channel sensing in the disclosure in the first time-frequency resource group in the disclosure, and obtaining the first measurement value in the disclosure; and when the first measurement value is greater than a target threshold, judging that the second time-frequency resource block in the disclosure does not belong to the first candidate resource block set in the disclosure; when the first measurement value is not greater than the target threshold, judging that the second time-frequency resource block belongs to the first candidate resource block set. Herein, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

In one embodiment, the first communication equipment 410 includes at least one processor and at least one memory. The at least one memory includes computer program codes. The at least one memory and the computer program codes are configured to be used in collaboration with the at least one processor. The first communication equipment 410 at least transmits the first information in the disclosure in the first time-frequency resource pool in the disclosure, or gives up transmitting the first information in the first time-frequency resource pool. Herein, the first information indicates that a third time-frequency resource block is reserved for first control information, the first control information is used for indicating whether a first transport block is correctly received, a second time-frequency resource block includes the third time-frequency resource block; a channel sensing performed in a first time-frequency resource group is used for determining a first measurement value; when the first measurement value is greater than a target threshold, the second time-frequency resource block is judged to not belong to a first candidate resource block set; when the first measurement value is not greater than the target threshold, the second time-frequency resource block is judged to belong to the first candidate resource block set; the target threshold is related to whether the first information is transmitted in the first time-frequency resource pool; the first time-frequency resource group is associated to the second time-frequency resource block.

In one embodiment, the first communication equipment 410 includes a memory that stores a computer readable instruction program. The computer readable instruction program generates an action when executed by at least one processor. The action includes: transmitting the first information in the disclosure in the first time-frequency resource pool in the disclosure, or giving up transmitting the first information in the first time-frequency resource pool. Herein, the first information indicates that a third time-frequency resource block is reserved for first control information, the first control information is used for indicating whether a first transport block is correctly received, a second time-frequency resource block includes the third time-frequency resource block; a channel sensing performed in a first time-frequency resource group is used for determining a first measurement value; when the first measurement value is greater than a target threshold, the second time-frequency resource block is judged to not belong to a first candidate resource block set; when the first measurement value is not greater than the target threshold, the second time-frequency resource block is judged to belong to the first candidate resource block set; the target threshold is related to whether the first information is transmitted in the first time-frequency resource pool; the first time-frequency resource group is associated to the second time-frequency resource block.

In one embodiment, the first node in the disclosure includes the second communication equipment 450.

In one embodiment, the second node in the disclosure includes the first communication equipment 410.

In one embodiment, at least one of the antenna 452, the receiver 454, the receiving processor 456, the multiantenna receiving processor 458, the controller/processor 459, the memory 460 or the data source 467 is used for receiving the first signaling in the disclosure; and at least one of the antenna 420, the transmitter 418, the transmitting processor 416, the multiantenna transmitting processor 471, the controller/processor 475 or the memory 576 is used for transmitting the first signaling in the disclosure.

In one embodiment, at least one of the antenna 420, the receiver 418, the receiving processor 470, the multiantenna receiving processor 472, the controller/processor 475 or the memory 476 is used for receiving the first information block in the disclosure; and at least one of the antenna 452, the transmitter 454, the transmitting processor 468, the multiantenna transmitting processor 457, the controller/processor 459, the memory 460 or the data source 467 is used for transmitting the first information block in the disclosure.

In one embodiment, at least one of the antenna 452, the receiver 454, the receiving processor 456, the multiantenna receiving processor 458, the controller/processor 459, the memory 460 or the data source 467 is used for receiving the first bit block set in the disclosure; and at least one of the antenna 420, the transmitter 418, the transmitting processor 416, the multiantenna transmitting processor 471, the controller/processor 475 or the memory 476 is used for transmitting the first bit block set in the disclosure.

In one embodiment, at least one of the antenna 452, the receiver 454, the receiving processor 456, the multiantenna receiving processor 458, the controller/processor 459, the memory 460 or the data source 467 is used for monitoring the first information in the disclosure in the first time-frequency resource pool in the disclosure; and at least one of the antenna 420, the transmitter 418, the transmitting processor 416, the multiantenna transmitting processor 471, the controller/processor 475 or the memory 476 is used for transmitting the first information in the disclosure in the first time-frequency resource pool in the disclosure.

In one embodiment, at least one of the antenna 452, the receiver 454, the receiving processor 456 or the multiantenna receiving processor 458 is used for performing the channel sensing in the disclosure in the first time-frequency resource group in the disclosure and obtaining the first measurement value in the disclosure.

In one embodiment, at least one of the antenna 452, the receiver 454, the receiving processor 456, the multiantenna receiving processor 458 or the controller/processor 459 is used for judging whether the second time-frequency resource block in the disclosure belongs to the first candidate resource block set in the disclosure.

In one embodiment, at least one of the antenna 452, the receiver 454, the receiving processor 456, the multiantenna receiving processor 458, the controller/processor 459, the memory 460 or the data source 467 is used for receiving the first reference signal in the disclosure in the first time-frequency resource group in the disclosure.

In one embodiment, at least one of the antenna 420, the transmitter 418, the transmitting processor 416, the multiantenna transmitting processor 471, the controller/processor 475 or the memory 476 is used for transmitting the first reference signal in the disclosure in the first time-frequency resource group in the disclosure.

In one embodiment, at least one of the antenna 452, the transmitter 454, the transmitting processor 468, the multiantenna transmitting processor 457, the controller/processor 459, the memory 460 or the data source 467 is used for selecting the M candidate resource block(s) in the disclosure in the first candidate resource block set in the disclosure.

In one embodiment, at least one of the antenna 452, the transmitter 454, the transmitting processor 468, the multiantenna transmitting processor 457, the controller/processor 459, the memory 460 or the data source 467 is used for transmitting the first signal in the disclosure in the M candidate resource block(s) in the disclosure.

In one embodiment, at least one of the antenna 420, the receiver 418, the receiving processor 470, the multiantenna receiving processor 472, the controller/processor 475 or the memory 476 is used for receiving the first signal in the disclosure;

In one embodiment, at least one of the antenna 452, the transmitter 454, the transmitting processor 468, the multi-antenna transmitting processor 457, the controller/processor 459, the memory 460 or the data source 467 is used for receiving the second information in the disclosure.

In one embodiment, at least one of the antenna 420, the transmitter 418, the transmitting processor 416, the multi-antenna transmitting processor 471, the controller/processor 475 or the memory 476 is used for transmitting the second information in the disclosure.

In one embodiment, at least one of the antenna 452, the receiver 454, the receiving processor 456 or the multiantenna receiving processor 458 is used for performing the channel sensing in the disclosure in the third time-frequency resource group in the disclosure and obtaining the second measurement value in the disclosure.

In one embodiment, at least one of the antenna 452, the receiver 454, the receiving processor 456, the multiantenna receiving processor 458 or the controller/processor 459 is used for judging whether the fourth time-frequency resource block in the disclosure belongs to the first candidate resource block set in the disclosure.

In one embodiment, at least one of the antenna 452, the transmitter 454, the transmitting processor 468, the multi-antenna transmitting processor 457, the controller/processor 459, the memory 460 or the data source 467 is used for receiving the third information in the disclosure.

Embodiment 5

Figure 5:
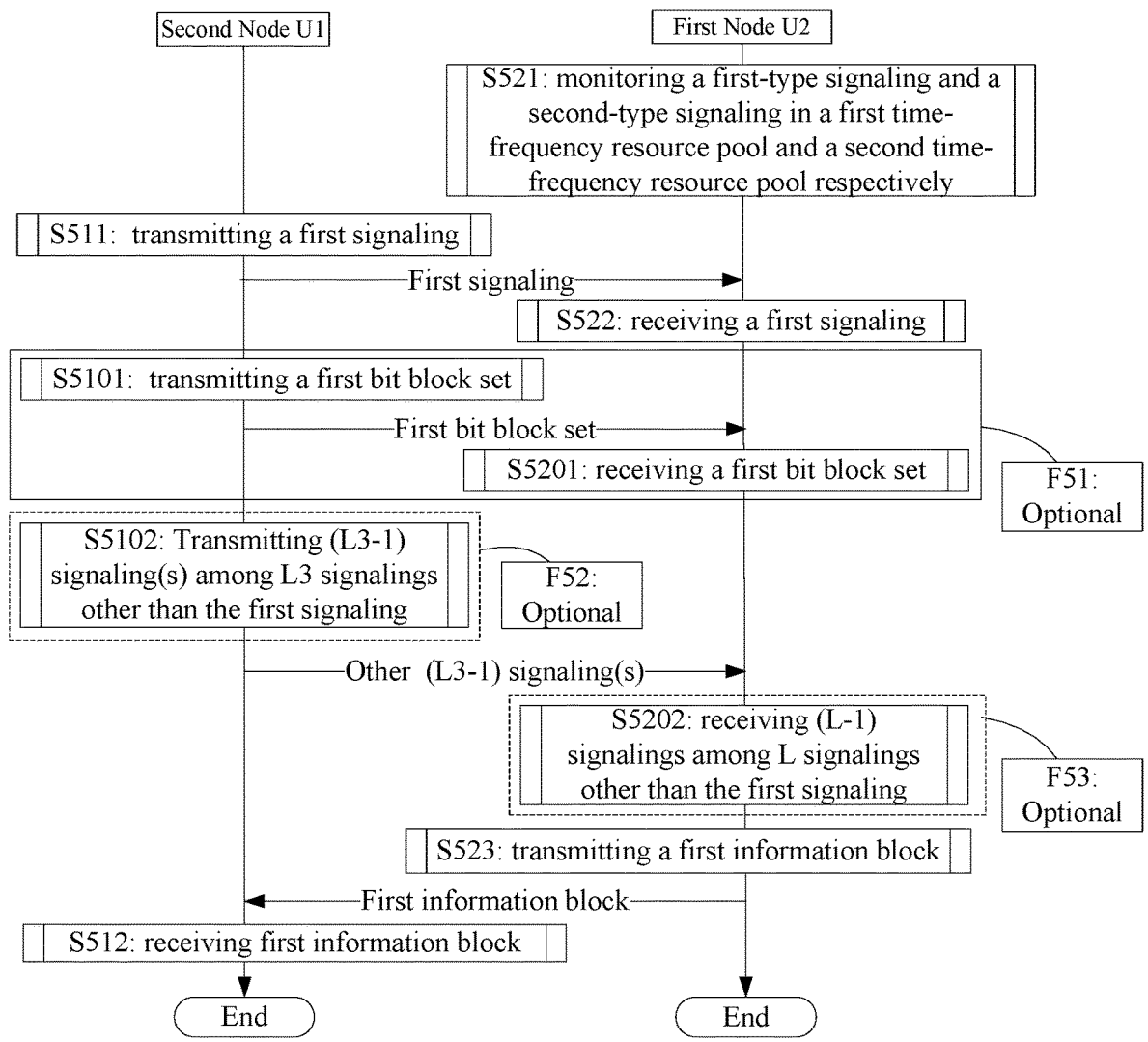
FIG. 5 is a flowchart of transmission according to one embodiment of the disclosure.

Embodiment 5 illustrates a flowchart of wireless transmission according to one embodiment of the disclosure, as shown in FIG. 5. In FIG. 5, a second node U1 and a first node U2 are communication nodes that perform transmission through an air interface. In FIG. 5, steps in boxes F51 to F55 are optional.

The second node U1 transmits a first signaling in S511, transmits a first bit block set in S5101, transmits (L3−1) signaling(s) among L3 signalings other than the first signaling in S5102, and receives a first information block in S512.

The first node U2 monitors a first-type signaling and a second-type signaling in a first time-frequency resource pool and a second time-frequency resource pool respectively in S521, receives a first signaling in S522, receives a first bit block set in S5201, receives (L−1) signalings among L signalings other than the first signaling in S5202, and transmits a first information block in S523.

In Embodiment 5, the first time-frequency resource pool and the second time-frequency resource pool are reserved for the first-type signaling and the second-type signaling respectively; the first signaling is used by the first node U2 to determine the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the first node U2 is the first node in the disclosure.

In one embodiment, the second node U1 is the second node in the disclosure.

In one embodiment, an air interface between the second node U1 and the first node U2 is a PC5 interface.

In one embodiment, an air interface between the second node U1 and the first node U2 includes a sidelink.

In one embodiment, an air interface between the second node U1 and the first node U2 includes a radio interface between a relay node and a UE.

In one embodiment, an air interface between the second node U1 and the first node U2 includes a radio interface between a UE and a UE.

In one embodiment, the first node in the disclosure is one terminal.

In one embodiment, the first node in the disclosure is one car.

In one embodiment, the first node in the disclosure is one vehicle.

In one embodiment, the first node in the disclosure is one Road Side Unit (RSU).

In one embodiment, the second node in the disclosure is one terminal.

In one embodiment, the second node in the disclosure is one car.

In one embodiment, the second node in the disclosure is one vehicle.

In one embodiment, the second node in the disclosure is one Road Side Unit (RSU).

In one embodiment, the phrase that a first time-frequency resource pool and a second time-frequency resource pool are reserved for a first-type signaling and a second-type signaling respectively includes: the first node in the disclosure monitors the first-type signaling in the first time-frequency resource pool, and monitors the second-type signaling in the second time-frequency resource pool.

In one embodiment, the phrase that a first time-frequency resource pool and a second time-frequency resource pool are reserved for a first-type signaling and a second-type signaling respectively includes: a target receiver of the first-type signaling monitors the first-type signaling in the first time-frequency resource pool, and a target receiver of the second-type signaling monitors the second-type signaling in the second time-frequency resource pool.

In one embodiment, the phrase that a first time-frequency resource pool and a second time-frequency resource pool are reserved for a first-type signaling and a second-type signaling respectively includes: the second node in the disclosure can transmit the first-type signaling in the first time-frequency resource pool, and the second node in the disclosure can transmit the second-type signaling in the second time-frequency resource pool.

In one embodiment, the first signaling includes scheduling information of the first bit block set; the first information block indicates whether each bit block in the bit block set is correctly received.

In one embodiment, the first signaling is used for indicating a semi-persistent scheduling release, and the first information block indicates whether the first signaling is correctly received.

In one embodiment, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

In one embodiment, the first information block includes L information subblocks, L being a positive integer greater than 1; L signalings are one-to-one corresponding to the L information subblocks, the first signaling is one of the L signalings, and the first signaling is corresponding to a first information subblock among the L information subblocks.

In one embodiment, the L signalings are used by the first node U2 to determine L second-type indexes respectively, and all the L second-type indexes have a same value.

In one embodiment, the L signalings are transmitted by one same transmitter.

In one embodiment, two of the L signalings are transmitted by different transmitters.

In one embodiment, L3 is a positive integer greater than 1 but not greater than L, any one of the L3 signalings is one of the L signalings, and the first signaling is one of the L3 signalings.

In one subembodiment, the L3 is equal to the L.

In one subembodiment, the L3 is less than the L.

In one embodiment, the first information block is transmitted on the first channel, and the first signaling is used by the first node U2 to determine air interface resources occupied by the first channel.

In one embodiment, the first signaling is transmitted on a sidelink physical layer control channel (that is, a sidelink channel capable of carrying physical layer signalings only).

In one embodiment, the first signaling is transmitted on a Physical Sidelink Control Channel (PSCCH).

In one embodiment, the first signaling is transmitted on a Physical Downlink Control Channel (PDCCH).

In one embodiment, the first information block is transmitted on a sidelink physical layer feedback channel (that is, a sidelink channel capable of carrying physical layer HARQ feedbacks only).

In one embodiment, the first information block is transmitted on a Physical Sidelink Feedback Channel (PSFCH).

In one embodiment, the first information block is transmitted on a sidelink physical layer data channel (that is, a sidelink channel capable of carrying physical layer data).

In one embodiment, the first information block is transmitted on a PSSCH.

In one embodiment, the first information block is transmitted on a Physical Uplink Control Channel (PUCCH).

In one embodiment, the first bit block set is transmitted on a sidelink physical layer data channel (that is, a sidelink channel capable of carrying physical layer data).

In one embodiment, the first bit block set is transmitted on a PSSCH.

In one embodiment, the first bit block set is transmitted on a Physical Downlink Shared Channel (PDSCH).

In one embodiment, the L signalings are transmitted on a PSCCH respectively.

Embodiment 6

Figure 6:
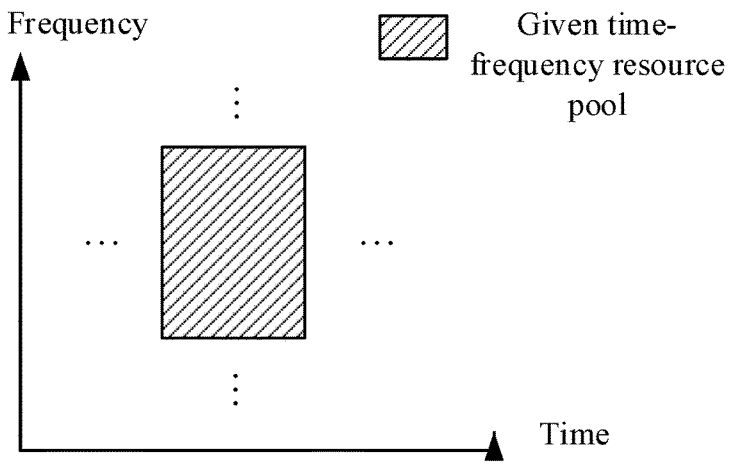
FIG. 6 is a diagram illustrating a given time-frequency resource pool according to one embodiment of the disclosure.

Embodiment 6 illustrates a diagram of a given time-frequency resource pool according to one embodiment of disclosure, as shown in FIG. 6. In Embodiment 6, the given time-frequency resource pool is any one of the first time-frequency resource pool and the second time-frequency resource pool in the disclosure.

In one embodiment, the given time-frequency resource pool is the first time-frequency resource pool.

In one embodiment, the given time-frequency resource pool is the second time-frequency resource pool.

In one embodiment, the given time-frequency resource pool includes a positive integer number of Resource Elements (REs).

In one embodiment, one RE occupies one multicarrier symbol in time domain, and occupies one subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the given time-frequency resource pool includes a positive integer number of subcarriers in frequency domain.

In one embodiment, the given time-frequency resource pool includes a positive integer number of Physical Resource Blocks (PRBs) in frequency domain.

In one embodiment, the given time-frequency resource pool includes a positive integer number of Resource Blocks (RBs) in frequency domain.

In one embodiment, the given time-frequency resource pool includes a positive integer number of sub-channels in frequency domain.

In one embodiment, the given time-frequency resource pool includes a positive integer number of multicarrier symbols in time domain.

In one embodiment, the given time-frequency resource pool includes a positive integer number of slots in time domain.

In one embodiment, the given time-frequency resource pool includes a positive integer number of inconsecutive slots in time domain.

In one embodiment, the given time-frequency resource pool includes a positive integer number of consecutive slots in time domain.

In one embodiment, the given time-frequency resource pool includes a positive integer number of subframes in time domain.

In one embodiment, the given time-frequency resource pool is configured by a higher layer signaling.

In one embodiment, the given time-frequency resource pool is configured by a Radio Resource Control (RRC) signaling.

In one embodiment, the given time-frequency resource pool is configured by a Medium Access Control layer Control Element (MAC CE) signaling.

In one embodiment, the given time-frequency resource pool is preconfigured.

In one embodiment, the given time-frequency resource pool is configured by a signaling transmitted over a Uu interface.

In one embodiment, the given time-frequency resource pool is configured by a signaling transmitted on a downlink.

In one embodiment, the given time-frequency resource pool is configured by a signaling transmitted on a sidelink.

In one embodiment, the first time-frequency resource and the second time-frequency resource pool are completely overlapped.

In one embodiment, the first time-frequency resource and the second time-frequency resource pool are partially overlapped.

In one embodiment, the first time-frequency resource and the second time-frequency resource pool are completely orthogonal.

In one embodiment, the first node in the disclosure does not monitor the second-type signaling in the disclosure in the first time-frequency resource pool, and does not monitor the first-type signaling in the disclosure in the second time-frequency resource pool.

In one embodiment, at least one RE in the first time-frequency resource pool does not belong to the second time-frequency resource pool.

In one embodiment, at least one RE in the second time-frequency resource pool does not belong to the first time-frequency resource pool.

In one embodiment, at least one RE in the first time-frequency resource belongs to the second time-frequency resource pool.

Embodiment 7

Embodiment 7 illustrates a diagram of a first signaling according to one embodiment of the disclosure, as shown in FIG. 7. In Embodiment 7, the first signaling includes scheduling information of the first bit block set in the disclosure; the first information block in the disclosure indicates whether each bit block in the first bit block set is correctly received.

In one embodiment, the phrase in the disclosure that the first signaling is used for determining the first information block includes: the first signaling includes scheduling information of the first bit block set; the first information block indicates whether each bit block in the first bit block set is correctly received.

In one embodiment, the first bit block set includes a positive integer number of bit blocks.

In one embodiment, the first bit block set includes one bit block.

In one embodiment, the first bit block set includes a plurality of bit blocks.

In one embodiment, each bit block in the first bit block set includes a positive integer number of binary bits.

In one embodiment, each bit block in the first bit block set is one Transport Block (TB).

In one embodiment, each bit block in the first bit block set is one Code Block (CB).

In one embodiment, each bit block in the first bit block set is one Code Block Group (CBG).

In one embodiment, the scheduling information of the first bit block set includes one or more of {occupied time domain resources, occupied frequency domain resources, a Modulation and Coding Scheme (MCS), a DeModulation Reference Signal (DMRS) configuration information, a Hybrid Automatic Repeat reQuest (HARQ) process number, a Redundancy Version (RV), and a New Data Indicator (NDI)} of a radio signal carrying the first bit block set.

In one embodiment, the first bit block set includes S bit block(s), S being a positive integer; the first information block includes S bit(s), the S bit(s) is(are) one-to-one corresponding to the S bit block(s). For any given one of the S bit blocks, if one of the S bits that is corresponding to the given bit block is equal to a first bit value, the first information block indicates that the given bit block is correctly received; if one of the S bits that is corresponding to the given bit block is equal to a second bit value, the first information block indicates that the given bit block is not correctly received.

In one subembodiment, the first bit value is ACK, and the second bit value is NACK.

In one subembodiment, the first bit value is 1, and the second bit value is 0.

In one subembodiment, the first bit value is 0, and the second bit value is 1.

In one embodiment, the first bit block set is unicast transmission.

In one embodiment, the first bit block set is groupcast transmission.

In one embodiment, when the first signaling is one first-type signaling, the first bit block set is groupcast transmission; when the first signaling is one second-type signaling, the first bit block set is unicast transmission.

In one embodiment, when the first signaling is one first-type signaling, the first bit block set is unicast transmission; when the first signaling is one second-type signaling, the first bit block set is groupcast transmission.

Embodiment 8

Embodiment 8 illustrates a diagram of a first signaling according to one embodiment of the disclosure, as shown in FIG. 8. In Embodiment 8, the first signaling is used for indicating a semi-persistent scheduling release, and the first information block in the disclosure indicates whether the first signaling is correctly received.

In one embodiment, the phrase in the disclosure that the first signaling is used for determining the first information block includes: the first signaling is used for indicating a semi-persistent scheduling release, and the first information block indicates whether the first signaling is correctly received.

In one embodiment, the phrase in the disclosure that the first signaling is used for determining the first information block includes: the first signaling is used for indicating a semi-persistent scheduling release, and the first information block indicates whether to perform the semi-persistent scheduling release.

In one embodiment, the semi-persistent scheduling release refers to: SPS release.

In one embodiment, the semi-persistent scheduling release includes DL SPS Release.

In one embodiment, the semi-persistent scheduling release includes SL SPS Release.

In one embodiment, for the first node in the disclosure, performing the semi-persistent scheduling release includes: before receiving a new SPS assignment signaling, stopping receiving a signal on a physical layer channel scheduled by a target signaling, wherein the target signaling is a signaling recently received for SPS assignment, the target signaling and the first signaling belong to one same carrier in frequency domain.

In one subembodiment, the target signaling is one Layer 1 (L1) signaling.

In one subembodiment, the target signaling is one RRC signaling.

In one subembodiment, the target signaling is one MAC CE signaling.

In one subembodiment, the target signaling and the first signaling are transmitted by one same serving cell.

In one embodiment, for the first node in the disclosure, performing the semi-persistent scheduling release includes: performing the indication of the first signaling.

Embodiment 9

Embodiment 9 illustrates a diagram of a first signaling and a first index according to one embodiment of the disclosure, as shown in FIG. 9. In Embodiment 9, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

In one embodiment, the phrase that the first signaling is associated to a first index includes: a signaling identifier of the first signaling is the first index.

In one embodiment, the phrase that the first signaling is associated to a first index includes: a CRC of the first signaling is scrambled by the first index.

In one embodiment, the phrase that the first signaling is associated to a first index includes: the first signaling includes an SCI with a CRC scrambled by the first index.

In one embodiment, the phrase that the first signaling is associated to a first index includes: the first signaling indicates the first index.

In one embodiment, the first signaling indicates explicitly the first index.

In one embodiment, the first signaling indicates implicitly the first index.

In one embodiment, the phrase that the first signaling is associated to a first index includes: a target receiver of the first bit block set is identified by the first index.

In one embodiment, the phrase that the first signaling is associated to a first index includes: the first index indicates a target receiver of the first bit block set.

In one embodiment, the phrase that the first signaling is associated to a first index includes: the first index indicates whether the first bit block set is unicast transmission or groupcast transmission.

In one subembodiment, the first index indicates that the first bit block set is groupcast transmission.

In one subembodiment, the first index indicates that the first bit block set is unicast transmission.

In one embodiment, the phrase that the first signaling is associated to a first index includes: a target receiver of the first signaling is identified by the first index.

In one embodiment, the phrase that the first signaling is associated to a first index includes: the first index indicates a target receiver of the first signaling.

In one embodiment, the phrase that the first signaling is associated to a first index includes: a type of services scheduled by the first signaling is identified by the first index.

In one embodiment, the phrase that the first signaling is associated to a first index includes: the first index is used for indicating a type of services scheduled by the first signaling.

In one embodiment, any one first-type signaling is associated to one first-type index, and a value of the first-type index associated to the any one first-type signaling is equal to one numerical value in the first numerical value set.

In one embodiment, any one second-type signaling is associated to one first-type index, and a value of the first-type index associated to the any one second-type signaling is equal to one numerical value in the second numerical value set.

In one embodiment, the first index includes a signaling identifier.

In one embodiment, the first index includes a Radio Network Temporary Identifier (RNTI).

In one embodiment, the first index includes a Cell-RNTI.

In one embodiment, the first index includes a destination group ID.

In one embodiment, the first index includes a Layer-1 destination group ID.

In one embodiment, the first index includes a destination ID.

In one embodiment, the first index includes a Layer-1 destination ID.

In one embodiment, the first index includes an identifier of the first node.

In one embodiment, a target receiver of the first bit block set is a first node set, the first node set includes the first node, and the first index includes an identifier of the first node set.

In one embodiment, a target receiver of the first signaling is a second node set, the second node set includes the first node, and the first index includes an identifier of the second node set.

In one embodiment, an identifier of the first node is a Layer-1 ID.

In one embodiment, an identifier of the first node includes a Layer-1 ID.

In one embodiment, a Layer-2 ID of the first node is used for determining an identifier of the first node.

In one embodiment, an identifier of the first node includes an RNTI.

In one embodiment, an RNTI of the first node is used for determining an identifier of the first node.

In one embodiment, an ID of the first node includes an International Mobile Subscriber Identification Number (IMSI).

In one embodiment, an IMSI of the first node is used for determining an identifier of the first node.

In one embodiment, an identifier of the first node includes an SAE Temporary Mobile Subscriber Identity (S-TMSI).

In one embodiment, an S-TMSI of the first node is used for determining an identifier of the first node.

In one embodiment, an identifier of the first node set is a Layer-1 ID.

In one embodiment, an identifier of the first node set includes a Layer-1 group ID.

In one embodiment, a Layer-2 group ID of the first node set is used for determining an identifier of the first node set.

In one embodiment, an identifier of the second node set is a Layer-1 ID.

In one embodiment, an identifier of the second node set includes a Layer-1 group ID.

In one embodiment, a Layer-2 group ID of the second node set is used for determining an identifier of the first node set.

In one embodiment, the first numerical value set and the second numerical value set include a positive integer number of numerical values respectively.

In one embodiment, the first numerical value set includes one numerical value only.

In one embodiment, the second numerical value set includes one numerical value only.

In one embodiment, the first numerical value set includes one numerical value only, the second numerical value set includes one numerical value only, and the one numerical value included in the first numerical value set is not equal to the one numerical value included in the second numerical value set.

In one embodiment, the first numerical value set includes a plurality of numerical values.

In one embodiment, the second numerical value set includes a plurality of numerical values.

In one embodiment, any one numerical value in the first numerical value set is a non-negative real number.

In one embodiment, any one numerical value in the first numerical value set is a non-negative integer.

In one embodiment, any one numerical value in the second numerical value set is a non-negative real number.

In one embodiment, any one numerical value in the second numerical value set is a non-negative integer.

Embodiment 10

Embodiment 10 illustrates a diagram of a first information block according to one embodiment of the disclosure, as shown in FIG. 10. In Embodiment 10, the first information block includes the L information subblocks in the disclosure; the L signalings in the disclosure are one-to-one corresponding to the L information subblocks, the first signaling in the disclosure is one of the L signalings, and the first signaling is corresponding to a first information subblock among the L information subblocks. In FIG. 10, the L information subblocks are indexed with #0, . . . , #L−1 respectively.

In one embodiment, the first information subblock is one of the L information subblocks.

In one embodiment, one of the L signalings is unicast transmission.

In one embodiment, one of the L signalings is groupcast transmission.

In one embodiment, one of the L signalings is broadcast transmission.

In one embodiment, the L signalings include a dynamic signaling.

In one embodiment, the L signalings include a Layer-1 (L1) signaling.

In one embodiment, the L signalings include a Layer-1 (L1) control signaling.

In one embodiment, the L signalings include an SCI.

In one embodiment, the L signalings include one or more fields in one SCI.

In one embodiment, the L signalings include a DCI.

In one embodiment, the L signalings include one or more fields in one DCI.

In one embodiment, the L signalings are transmitted on a sidelink respectively.

In one embodiment, the L signalings are transmitted through a PC5 interface respectively.

In one embodiment, the first field in the first signaling in the disclosure is used for determining the first information subblock from the L information subblocks.

In one embodiment, the first field in the first signaling in the disclosure indicates a position of the first information subblock in the L information subblocks.

In one embodiment, two of the L information subblocks include different numbers of information bits.

In one embodiment, any two of the L information subblocks include a same numbers of information bits.

In one embodiment, L1 signalings among the L signalings include scheduling information of L1 bit block sets respectively, L2 signalings among the L signalings are used for indicating a semi-persistent scheduling release respectively, the L1 and L2 are non-negative integers not greater than the L. L1 information subblocks among the L information subblocks that are one-to-one corresponding to the L1 signalings indicate respectively whether each bit block in the L1 bit block sets is correctly received; L2 information subblocks among the L information subblocks that are one-to-one corresponding to the L2 signalings indicate respectively whether the L2 signalings are correctly received.

In one subembodiment, the L1 is equal to 0.

In one subembodiment, the L1 is greater than 0.

In one subembodiment, the L2 is equal to 0.

In one subembodiment, the L2 is greater than 0.

In one subembodiment, the L1 is equal to the L.

In one subembodiment, the L1 is less than the L.

In one subembodiment, the L2 is equal to the L.

In one subembodiment, the L2 is less than the L.

In one subembodiment, none of the L signalings belongs to the L1 signalings and the L2 signalings simultaneously.

In one subembodiment, the L is equal to a summation of the L1 and the L2.

In one subembodiment, any one of the L1 bit block sets includes a positive integer number of bit blocks.

In one subembodiment, each bit block in the L1 bit block set is one TB.

In one subembodiment, each bit block in the L1 bit block set is one CB.

In one subembodiment, each bit block in the L1 bit block set is one CBG.

In one embodiment, the first signaling is one first-type signaling, the L signalings include only the first-type signal among the first-type signaling and the second-type signaling.

In one embodiment, the first signaling is one second-type signaling, the L signalings include the first-type signaling and the second-type signaling.

In one embodiment, the L signalings have a same transmitter.

In one embodiment, at least two of the L signalings have different transmitters.

In one embodiment, the first signaling is a latest signaling among the L signalings.

In one embodiment, the first signaling is not a latest signaling among the L signalings.

Embodiment 11

Embodiment 11 illustrates a diagram of L signalings and L second-type indexes according to one embodiment of the disclosure, as shown in FIG. 11. In Embodiment 11, the L signalings are used for determining L second-type indexes respectively, and all the L second-type indexes have a same value. In FIG. 11, the L signalings and the L second-type indexes are indexed with #0, . . . , #L−1 respectively.

In one embodiment, any one of the L signalings indicates a corresponding second-type index.

In one embodiment, any one of the L signalings indicates explicitly a corresponding second-type index.

In one embodiment, any one of the L signalings indicates implicitly a corresponding second-type index.

In one embodiment, any one of the L second-type indexes indicates a transmitter of a corresponding signaling.

In one embodiment, any one of the L second-type indexes includes an identifier of a transmitter of a corresponding signaling.

In one embodiment, any one of the L second-type indexes includes a Layer-1 ID of a transmitter of a corresponding signaling.

In one embodiment, the L second-type indexes include a source ID.

In one embodiment, the L second-type indexes include a Layer-1 source ID.

In one embodiment, any one of the L second-type indexes is a non-negative real number.

In one embodiment, any one of the L second-type indexes is a non-negative integer.

Embodiment 12

Figure 12:
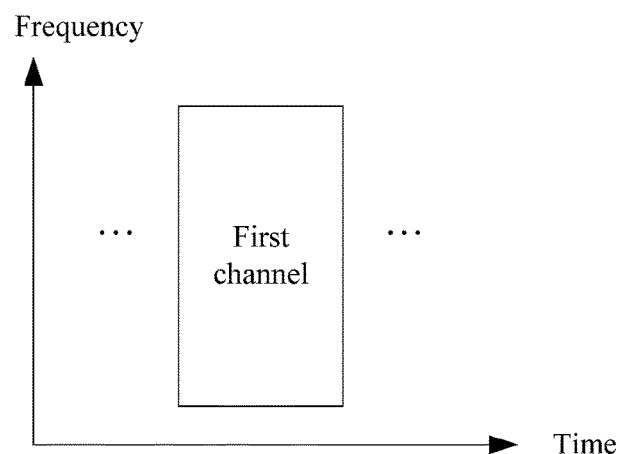
FIG. 12 is a diagram illustrating a first channel according to one embodiment of the disclosure.

Embodiment 12 illustrates a diagram of a first channel according to one embodiment of the disclosure, as shown in FIG. 12. In Embodiment 12, the first information block in the disclosure is transmitted on the first channel, and the first signaling in the disclosure is used for determining air interface resources occupied by the first channel.

In one embodiment, the first channel includes one PSFCH.

In one embodiment, the first channel includes one PSSCH.

In one embodiment, the first channel includes one PUCCH.

In one embodiment, air interface resources occupied by the first channel include time domain resources and frequency domain resources.

In one embodiment, air interface resources occupied by the first channel include time domain resources, frequency domain resources and code domain resources.

In one embodiment, time domain resources occupied by the first signaling are used for determining air interface resources occupied by the first channel.

In one embodiment, frequency domain resources occupied by the first signaling are used for determining air interface resources occupied by the first channel.

In one embodiment, time-frequency resources occupied by the first signaling are used for determining air interface resources occupied by the first channel.

In one embodiment, the first signaling includes scheduling information of the second channel, and the first bit block set is transmitted on the second channel.

In one subembodiment, time domain resources occupied by the second channel are used for determining air interface resources occupied by the first channel.

In one subembodiment, frequency domain resources occupied by the second channel are used for determining air interface resources occupied by the first channel.

In one subembodiment, time-frequency resources occupied by the second channel are used for determining air interface resources occupied by the first channel.

In one embodiment, the first index in the disclosure is used for determining air interface resources occupied by the first channel.

In one embodiment, an identifier of the first node in the disclosure is used for determining air interface resources occupied by the first channel.

In one embodiment, a target receiver of the first bit block set in the disclosure is a third node set, and the first node is one node in the third node set.

In one subembodiment, the third node set identifier is used for determining air interface resources occupied by the first channel.

In one subembodiment, an identifier of the first node in the third node set is used for determining air interface resources occupied by the first channel.

In one embodiment, a target receiver of the first signaling is a fourth node set, and the first node is one node in the fourth node set.

In one subembodiment, the fourth node set identifier is used for determining air interface resources occupied by the first channel.

In one subembodiment, an identifier of the first node in the fourth node set is used for determining air interface resources occupied by the first channel.

In one embodiment, when the first signaling is one first-type signaling, time-frequency resources occupied by the first channel are within the first time-frequency resource pool; when the first signaling is one second-type signaling, time-frequency resources occupied by the first channel are within the second time-frequency resource pool.

In one embodiment, the first signaling is a last first-type signaling or second-type signaling received by the first node before a first time point, and the first time point is earlier than a start time of time domain resources used for transmitting the first information block in the disclosure.

In one embodiment, the first signaling is a last first-type signaling or second-type signaling transmitted by a transmitter of the first signaling and received by the first node before a first time point, and the first time point is earlier than a start time of time domain resources used for transmitting the first information block in the disclosure.

In one embodiment, a time interval between the first time point and the start time of time domain resources of the first information block is semi-statically configured.

In one embodiment, a time interval between the first time point and the start time of time domain resources of the first information block is configured by a higher layer signaling.

In one embodiment, a time interval between the first time point and the start time of time domain resources of the first information block is preconfigured.

Embodiment 13

Figure 13:
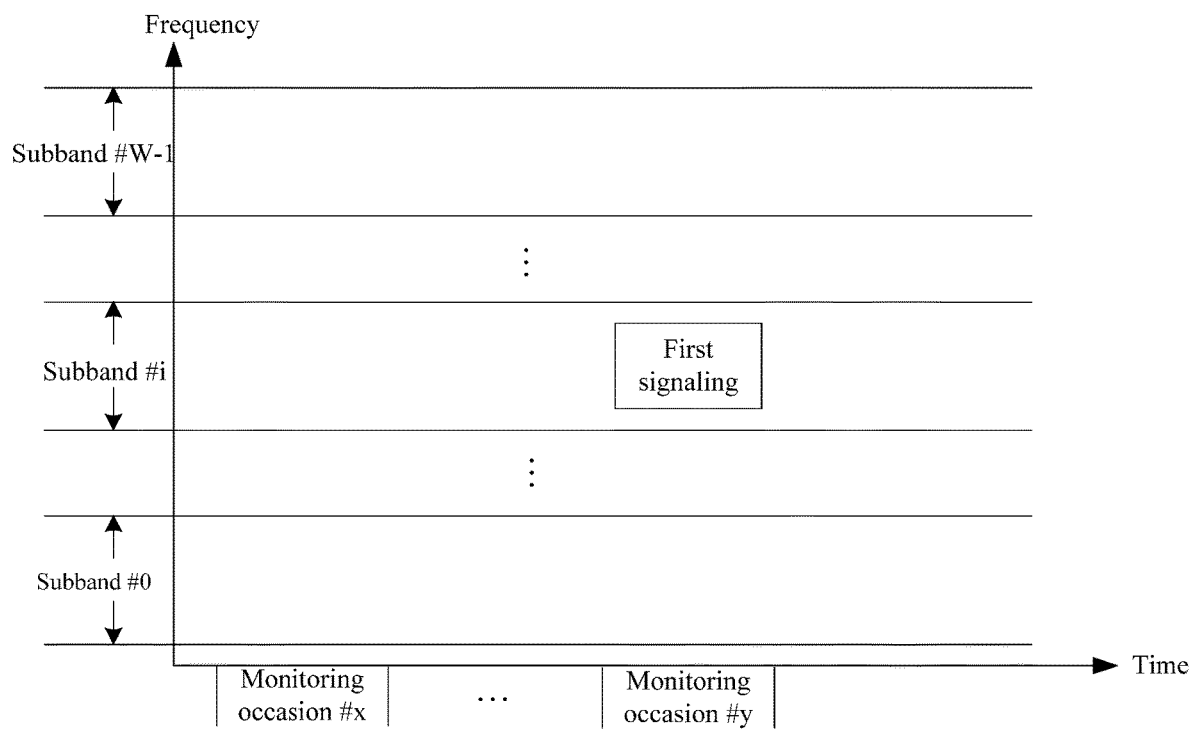
FIG. 13 is a diagram illustrating a first domain according to one embodiment of the disclosure.

Embodiment 13 illustrates a diagram of a first domain according to one embodiment of the disclosure, as shown in FIG. 13. In Embodiment 13, the first node in the disclosure configures W subbands, W being a positive integer. The first time-frequency resource pool in the disclosure includes the frequency domain resources in at least one of the W subbands in frequency domain, the second time-frequency resource pool in the disclosure includes the frequency domain resources in at least one of the W subbands in frequency domain. The first field in the first signaling in the disclosure is used for determining a number of signalings accumulated in a target signaling set until a current subband and a current monitoring occasion; when the first signaling is one first-type signaling, the target signaling set includes only the first-type signaling among the first-type signaling and the second-type signaling; when the first signaling is one second-type signaling, the target signaling set includes the first-type signaling and the second-type signaling.

In FIG. 13, the W subbands are indexed with #0, . . . , #W−1 respectively. The first signaling is located within a subband #i in frequency domain and within a monitoring occasion #y in time domain, wherein the i is a non-negative integer not greater than the W, the y is a non-negative integer. In FIG. 13, x is a non-negative integer less than the y.

In one embodiment, the current subband is the subband #i shown in FIG. 13; the current monitoring occasion is the monitoring occasion #y shown in FIG. 13.

In one embodiment, the W is equal to 1.

In one embodiment, the W is greater than 1.

In one embodiment, any one of the W subbands includes a positive integer number of consecutive subcarriers.

In one embodiment, the W subbands are W Band Width Parts (BWPs) respectively.

In one embodiment, the W subbands are W carriers respectively.

In one embodiment, the W subbands are orthogonal to each other.

In one embodiment, two of the W subbands are partially overlapped.

In one embodiment, the current subband is one of the W subbands that includes the frequency domain resources occupied by the first signaling.

In one embodiment, the current monitoring occasion is a monitoring occasion to which the first signaling belongs.

In one embodiment, frequency domain resources occupied by the first signaling belong to the current subband.

In one embodiment, a monitoring occasion occupied by the first signaling belongs to the current monitoring occasion.

In one embodiment, the monitoring occasion refers to a monitoring occasion.

In one embodiment, the monitoring occasion includes a physical downlink control channel monitoring occasion.

In one embodiment, the monitoring occasion includes a PDCCH monitoring occasion.

In one embodiment, the monitoring occasion includes a physical sidelink control channel monitoring occasion.

In one embodiment, the monitoring occasion includes a PSCCH monitoring occasion.

In one embodiment, the first time-frequency resource pool includes the frequency domain resources in only one of the W subbands in frequency domain.

In one embodiment, the first time-frequency resource pool includes the frequency domain resources in several of the W subbands in frequency domain.

In one embodiment, the second time-frequency resource pool includes the frequency domain resources in only one of the W subbands in frequency domain.

In one embodiment, the second time-frequency resource pool includes the frequency domain resources in several of the W subbands in frequency domain.

In one embodiment, the first field in the first signaling is used for determining a number of accumulated subband-monitoring occasion pairs including the signalings in the target signaling set until the current subband and the current monitoring occasion according to the increasing order of subband indexes first and then according to the increasing order of monitoring occasion indexes.

In one embodiment, the first field in the first signaling is used for determining a number of accumulated subband-monitoring occasion pairs including the signalings in the target signaling set until the current subband and the current monitoring occasion according to the increasing order of subband indexes first and then according to the increasing order of monitoring occasion indexes and a total number of accumulated subband-monitoring occasion pairs including the signalings in the target signaling set until the current monitoring occasion.

In one embodiment, the first field in the first signaling is used for determining a number of accumulated monitoring occasions including the signalings in the target signaling set until a current monitoring occasion according to the increasing order of monitoring occasions indexes.

In one embodiment, the W subbands belong to W serving cells respectively.

In one embodiment, the first field in the first signaling is used for determining a number of accumulated serving cell-monitoring occasion pairs including the signalings in the target signaling set until the current serving cell and the current monitoring occasion according to the increasing order of serving cell indexes first and then according to the increasing order of monitoring occasion indexes.

In one embodiment, the first field in the first signaling is used for determining a number of accumulated serving cell-monitoring occasion pairs including the signalings in the target signaling set until the current serving cell and the current monitoring occasion according to the increasing order of serving cell indexes first and then according to the increasing order of monitoring occasion indexes and a total number of accumulated serving cell-monitoring occasion pairs including the signalings in the target signaling set until the current monitoring occasion.

In one embodiment, frequency domain resources occupied by the first signaling belong to the current serving cell.

In one embodiment, the first signaling is one first-type signaling, the first field in the first signaling is used for determining a number of accumulated subband-monitoring occasion pairs including the first-type signaling until the current subband and the current monitoring occasion according to the increasing order of subband indexes first and then according to the increasing order of monitoring occasion indexes.

In one embodiment, the first signaling is one first-type signaling, the first field in the first signaling is used for determining a number of accumulated subband-monitoring occasion pairs including the first-type signaling until the current subband and the current monitoring occasion according to the increasing order of subband indexes first and then according to the increasing order of monitoring occasion indexes, and a total number of subband-monitoring occasion pairs including the first-type signaling until the current monitoring occasion.

In one embodiment, the first signaling is one second-type signaling, the first field in the first signaling is used for determining a number of accumulated subband-monitoring occasion pairs including the first-type signaling or the second-type signaling until the current subband and the current monitoring occasion according to the increasing order of subband indexes first and then according to the increasing order of monitoring occasion indexes.

In one embodiment, the first signaling is one second-type signaling, the first field in the first signaling is used for determining a number of accumulated subband-monitoring occasion pairs including the first-type signaling or the second-type signaling until the current subband and the current monitoring occasion according to the increasing order of subband indexes first and then according to the increasing order of monitoring occasion indexes, and a total number of subband-monitoring occasion pairs including the first-type signaling or the second-type signaling until the current monitoring occasion.

In one embodiment, the number of accumulated subband-monitoring occasion pairs including the signalings in the target signaling set until the current subband and the current monitoring occasion according to the increasing order of subband indexes first and then according to the increasing order of monitoring occasion indexes is X1; a value of the first field in the first signaling is equal to the X1−1 modulo a first integer plus 1, that is, mod(X1−1, first integer)+1.

In one subembodiment, the first field includes two bits, and the first integer is equal to 4.

In one embodiment, the number of accumulated subband-monitoring occasion pairs including the signalings in the target signaling set until the current subband and the current monitoring occasion according to the increasing order of subband indexes first and then according to the increasing order of monitoring occasion indexes is X1; the number of accumulated subband-monitoring occasion pairs including the signalings in the target signaling set until the current monitoring occasion according to the increasing order of subband indexes first and then according to the increasing order of monitoring occasion indexes is X2. A value of the former Q1 bits included in the first field is equal to the X1−1 modulo a second integer plus 1, that is, mod(X1−1, second integer)+1; a value of the latter Q2 bits included in the first field is equal to the X2-1 modulo a third integer plus 1, that is, mod(X2-1, third integer)+1, wherein Q1 and Q2 are positive integers respectively.

In one subembodiment, the first field is composed of Q1+Q2 bits.

In one subembodiment, the first field includes 4 bits, the Q1 and the Q2 are equal to 2 respectively, the second integer and the third integer are both equal to 4.

In one embodiment, a first given integer modulo a second given integer is equal to a difference between the first given integer and a third given integer, the third given integer is equal to a product of a fourth given integer and the second given integer, the fourth given integer is a maximum integer not greater than a quotient of the first given integer divided by the second given integer.

Embodiment 14

Figure 14:
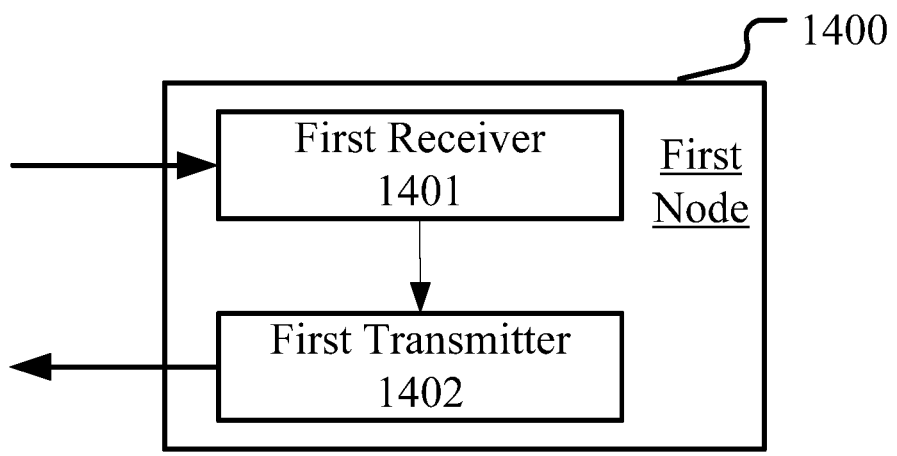
FIG. 14 is a structure block diagram illustrating a processing device in a first node equipment according to one embodiment of the disclosure.

Embodiment 14 illustrates a structure block diagram of a processing device in a first node according to one embodiment of the disclosure, as shown in FIG. 14. In FIG. 14, the processing device 1400 in the first node includes a first receiver 1401 and a first transmitter 1402.

In Embodiment 14, the first receiver 1401 monitors a first-type signaling and a second-type signaling in a first time-frequency resource pool and a second time-frequency resource pool respectively, and receives a first signaling; the first transmitter 1402 transmits a first information block.

In Embodiment 14, the first signaling is used for determining the first information block; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the first receiver 1401 receives a first bit block set, wherein the first signaling includes scheduling information of the first bit block set; the first information block indicates whether each bit block in the first bit block set is correctly received.

In one embodiment, the first signaling is used for indicating a semi-persistent scheduling release, and the first information block indicates whether the first signaling is correctly received.

In one embodiment, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

In one embodiment, the first information block includes L information subblocks, L being a positive integer greater than 1; L signalings are one-to-one corresponding to the L information subblocks, the first signaling is one of the L signalings, and the first signaling is corresponding to a first information subblock among the L information subblocks.

In one embodiment, the L signalings are used for determining L second-type indexes respectively, and all the L second-type indexes have a same value.

In one embodiment, the first receiver 1401 receives (L−1) signaling(s) among the L signalings other than the first signaling.

In one embodiment, the first information block is transmitted on a first channel, and the first signaling is used for determining air interface resources occupied by the first channel.

In one embodiment, the first node is a UE.

In one embodiment, the first node is a relay node.

In one embodiment, the first receiver 1401 includes at least one of the antenna 452, the receiver 454, the receiving processor 456, the multiantenna receiving processor 458, the controller/processor 459, the memory 460 or the data source 467 in Embodiment 4.

In one embodiment, the first transmitter 1402 includes at least one of the antenna 452, the transmitter 454, the transmitting processor 468, the multiantenna transmitting processor 457, the controller/processor 459, the memory 460 or the data source 467 in Embodiment 4.

Embodiment 15

Figure 15:
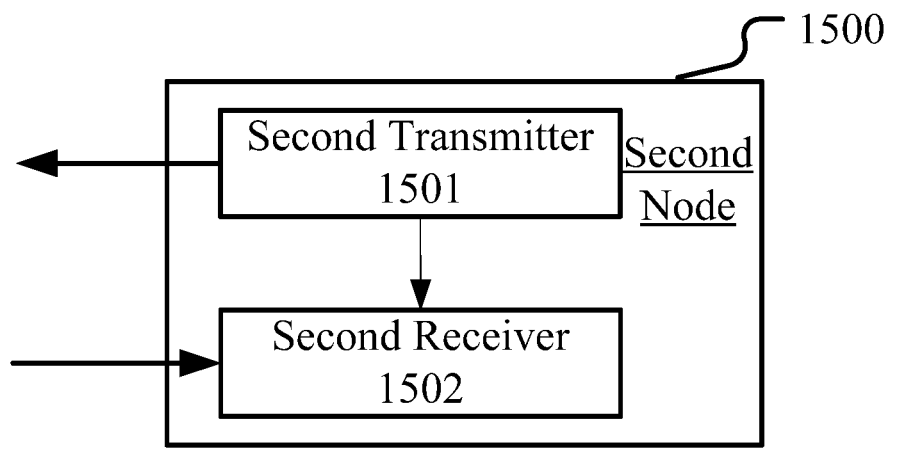
FIG. 15 is a structure block diagram illustrating a processing device in a second node equipment according to one embodiment of the disclosure.

Embodiment 15 illustrates a structure block diagram of a processing device in a second node according to one embodiment of the disclosure, as shown in FIG. 15. In FIG. 15, the processing device 1500 in the second node includes a second transmitter 1501 and a second receiver 1502.

In Embodiment 15, the second transmitter 1501 transmits a first signaling; and the second receiver 1502 receives a first information block.

In Embodiment 15, the first signaling is used for determining the first information block; a first time-frequency resource pool and a second time-frequency resource pool are reserved for a first-type signaling and a second-type signaling respectively; the first signaling includes a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

In one embodiment, the second transmitter 1501 transmits a first bit block set; wherein the first signaling includes scheduling information of the first bit block set; the first information block indicates whether each bit block in the first bit block set is correctly received.

In one embodiment, the first signaling is used for indicating a semi-persistent scheduling release, and the first information block indicates whether the first signaling is correctly received In one embodiment, the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

In one embodiment, the first information block includes L information subblocks, L being a positive integer greater than 1; L signalings are one-to-one corresponding to the L information subblocks, the first signaling is one of the L signalings, and the first signaling is corresponding to a first information subblock among the L information subblocks.

In one embodiment, the L signalings are used for determining L second-type indexes respectively, and all the L second-type indexes have a same value.

In one embodiment, the second transmitter 1501 transmits (L3-1) signaling(s) among L3 signalings other than the first signaling, wherein L3 is a positive integer greater than 1 but not greater than the L, any one of the L3 signalings is one of the L signalings, and the first signaling is one of the L3 signalings.

In one embodiment, the first information block is transmitted on a first channel, and the first signaling is used for determining air interface resources occupied by the first channel.

In one embodiment, the second node is a UE.

In one embodiment, the second node is a relay node.

In one embodiment, the second transmitter 1501 includes at least one of the antenna 420, the transmitter 418, the transmitting processor 416, the multiantenna transmitting processor 471, the controller/processor 475, or the memory 476 in Embodiment 4.

In one embodiment, the second receiver 1502 includes at least one of the antenna 420, the receiver 418, the receiving processor 470, the multiantenna receiving processor 472, the controller/processor 475 or the memory 476 in Embodiment 4.

Embodiment 16

Figure 16:
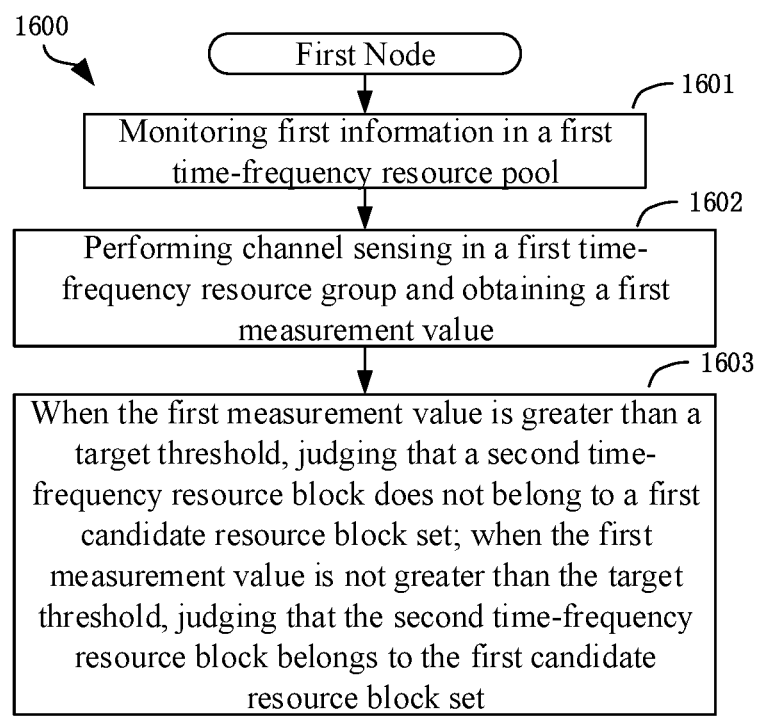
FIG. 16 is a flowchart of monitoring first information, obtaining a first measurement value and judging whether a second time-frequency resource block belongs to a first candidate resource block set according to one embodiment of the disclosure.

Embodiment 16 illustrates a flowchart of monitoring first information, obtaining a first measurement value and judging whether a second time-frequency resource block belongs to a first candidate resource block set according to one embodiment of the disclosure, as shown in FIG. 16. In 1600 in FIG. 16, each box represents one step. In particular, the order of each step in the box does not represent the relationship in time precedence between the steps.

In Embodiment 16, the first node in the disclosure monitors first information in a first time-frequency resource pool in S1601, performs channel sensing in a first time-frequency resource group and obtains a first measurement value in S1602; and in S1603 when the first measurement value is greater than a target threshold, judges that a second time-frequency resource block does not belong to a first candidate resource block set; when the first measurement value is not greater than the target threshold, judges that the second time-frequency resource block belongs to the first candidate resource block set. Herein, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

In one embodiment, the first information is dynamic information.

In one embodiment, the first information is L1 information.

In one embodiment, the first information is L1 control information.

In one embodiment, the first information is carried by a physical layer signaling.

In one embodiment, the first information is carried by an L1 signaling.

In one embodiment, the first information is carried by an L1 control signaling.

In one embodiment, the first information includes an SCI.

In one embodiment, the first information includes one or more fields in one SCI.

In one embodiment, the first information includes information carried by one or more fields in one SCI.

In one embodiment, the first information is groupcast transmission.

In one embodiment, the first information is unicast transmission.

In one embodiment, the first information is transmitted on a sidelink.

In one embodiment, the first information is transmitted through a PC5 interface.

In one embodiment, the phrase of monitoring first information includes: monitoring a signaling carrying the first information.

In one embodiment, the phrase of monitoring first information includes: monitoring the first signaling in the disclosure.

In one embodiment, the phrase of monitoring first information includes: monitoring a signaling, and judging whether a detected signal carries the first information.

In one subembodiment, the signaling is an L1 control signaling.

In one subembodiment, the signaling includes an SCI.

In one subembodiment, the signaling includes one or more fields in one SCI.

In one embodiment, the monitoring refers to a reception based on energy detection, that is, sensing energies of radio signals in the first time-frequency resource pool and averaging the energies to obtain a received energy; if the received energy is greater than a second given threshold, it is judged that the first information is detected, otherwise, it is judged that the first information is not detected, In one embodiment, the monitoring refers to a coherent reception, that is, performing a coherent reception in the first time-frequency resource pool and measuring an energy of a signal obtained after the coherent reception; if the energy of the signal obtained after the coherent reception is greater than a first given threshold, it is judged that the first information is detected, otherwise, it is judged that the first information is not detected, In one embodiment, the monitoring refers to a coherent reception, that is, performing a coherent reception in the first time-frequency resource pool and measuring an energy of a signal obtained after the coherent reception; if the energy of the signal obtained after the coherent reception is greater than a first given threshold, it is judged that a given signaling is detected; if the given signaling carries the first information, it is judged that the first information is detected; if the energy of the signal obtained after the coherent reception is not greater than the first given threshold or the given signaling does not carry the first information, it is judged that the first information is not detected.

In one embodiment, the monitoring refers to a blind decoding, that is, receiving a signal in the first time-frequency resource pool and performing a decoding operation; if the decoding is determined to be correct according to CRC bits, it is judged that the first information is detected, otherwise, it is judged that the first information is not detected.

In one embodiment, the monitoring refers to a blind decoding, that is, receiving a signal in the first time-frequency resource pool and performing a decoding operation; if the decoding is determined to be correct according to CRC bits, it is judged that a given signaling is detected; if the given signaling carries the first information, it is judged that the first information is detected; if the decoding is determined to be incorrect according to CRC bits or the given signaling does not carry the first information, it is judged that the first information is not detected.

In one embodiment, the channel sensing includes sensing.

In one embodiment, the channel sensing includes an energy detection, that is, sensing energies of radio signals and averaging them to obtain an average received energy.

In one embodiment, the channel sensing includes a power detection, that is, sensing powers of radio signals and averaging them to obtain an average receiving power.

In one embodiment, the channel sensing includes a coherent detection, that is, performing a coherent reception and measuring an average energy of signals obtained after the coherent reception.

In one embodiment, the channel sensing includes a coherent detection, that is, performing a coherent reception and measuring an average power of signals obtained after the coherent reception.

In one embodiment, the first measurement value includes a Reference Signal Received Power (RSRP).

In one embodiment, the first measurement value includes an L1-RSRP.

In one embodiment, the first measurement value includes a Reference Signal Received Quality (RSRQ).

In one embodiment, the first measurement value includes a Channel Quality Indicator (CQI).

In one embodiment, the first measurement value includes a Received Signal Strength Indicator (RRSI).

In one embodiment, the first measurement value is in unit of Watt.

In one embodiment, the target threshold is in unit of Watt.

In one embodiment, the first measurement value is in unit of dBm.

In one embodiment, the target threshold is in unit of dBm.

In one embodiment, the target threshold is related to a first priority set, and the first priority set includes a positive integer number of priorities.

In one embodiment, the first priority set includes 2 priorities.

In one embodiment, the first priority set includes 1 priority only.

In one embodiment, the first priority set includes a priority of the first transport block.

In one embodiment, the second time-frequency resource group in the disclosure is reserved for K3 transport blocks, K3 being a positive integer; the first priority set includes priorities of the K3 transport blocks.

In one embodiment, a signaling carrying the second information in the disclosure indicates a first priority, and the first priority set includes the first priority.

In one embodiment, the first priority set includes a priority of the first signal in the disclosure.

In one embodiment, the first signaling in the disclosure indicates the priority of the first transport block.

In one embodiment, the first information indicates explicitly that the third time-frequency resource block is reserved for the first control information.

In one embodiment, the first information indicates implicitly that the third time-frequency resource block is reserved for the first control information.

In one embodiment, the first control information includes a Hybrid Automatic Repeat reQuest-Acknowledgement (HARQ-ACK).

In one embodiment, the first control information includes an CSI.

In one embodiment, the first control information is transmitted on a sidelink.

In one embodiment, the first control information is transmitted through a PC5 interface.

In one embodiment, the first control information is transmitted on a PSFCH.

In one embodiment, the first control information is transmitted on a PSCCH.

In one embodiment, the first control information is transmitted on a PSSCH.

In one embodiment, the phrase that the third time-frequency resource block is reserved for the first control information includes: the third time-frequency resource block is reserved for an information bit included in the first control information.

In one embodiment, the phrase that the third time-frequency resource block is reserved for the first control information includes: the third time-frequency resource block is reserved for the transmission of a radio signal carrying the first control information.

In one embodiment, the phrase that the third time-frequency resource block is reserved for the first control information includes: a transmitter of the first control information does not need to perform channel sensing before transmitting the first control information in the third time-frequency resource block.

In one embodiment, the first transport block includes one TB.

In one embodiment, time-frequency resources occupied by the first transport block belong to the first time-frequency resource group.

In one embodiment, time-frequency resources occupied by the first transport block do not belong to the first time-frequency resource group.

In one embodiment, the first node detects the first information in the first time-frequency resource pool, and time-frequency resources occupied by the first transport block belong to the first time-frequency resource group.

In one embodiment, the first node detects the first information in the first time-frequency resource pool, and time-frequency resources occupied by the first transport block do not belong to the first time-frequency resource group.

In one embodiment, the first transport block is transmitted on a sidelink.

In one embodiment, the first transport block is transmitted through a PC5 interface.

In one embodiment, the first transport block is transmitted on a PSSCH.

In one embodiment, the second time-frequency resource block is unrelated to whether the first information is detected in the first time-frequency resource pool.

In one embodiment, the second time-frequency resource block is related to whether the first information is detected in the first time-frequency resource pool.

In one embodiment, a length of time domain resources occupied by the second time-frequency resource block when the first information is detected in the first time-frequency resource pool is less than a length of time domain resources occupied by the second time-frequency resource block when the first information is not detected in the first time-frequency resource pool.

In one embodiment, the second time-frequency resource block includes the third time-frequency resource block and the fourth time-frequency resource block, the third time-frequency resource block is orthogonal to the fourth time-frequency resource block in time-frequency domain.

In one subembodiment, the third time-frequency resource block is orthogonal to the fourth time-frequency resource block in time domain.

In one subembodiment, the fourth time-frequency resource block is earlier than the third time-frequency resource block in time domain.

In one subembodiment, an end time of the fourth time-frequency resource block is not later than a start time of the third time-frequency resource block.

In one subembodiment, the third time-frequency resource block is non-orthogonal to the fourth time-frequency resource block in time domain.

In one subembodiment, the fourth time-frequency resource block and the third time-frequency resource block occupy same frequency domain resources.

In one subembodiment, frequency domain resources occupied by the fourth time-frequency resource block include frequency domain resources occupied by the third time-frequency resource block.

In one embodiment, the second time-frequency resource block is the third time-frequency resource block.

In one embodiment, the second time-frequency resource block and the third time-frequency resource block are completely overlapped.

In one embodiment, the first time-frequency resource group is unrelated to whether the first information is detected in the first time-frequency resource pool.

In one embodiment, the first information is transmitted on a PUCCH.

In one embodiment, the first information is transmitted on a PSCCH.

Embodiment 17

Figure 17:
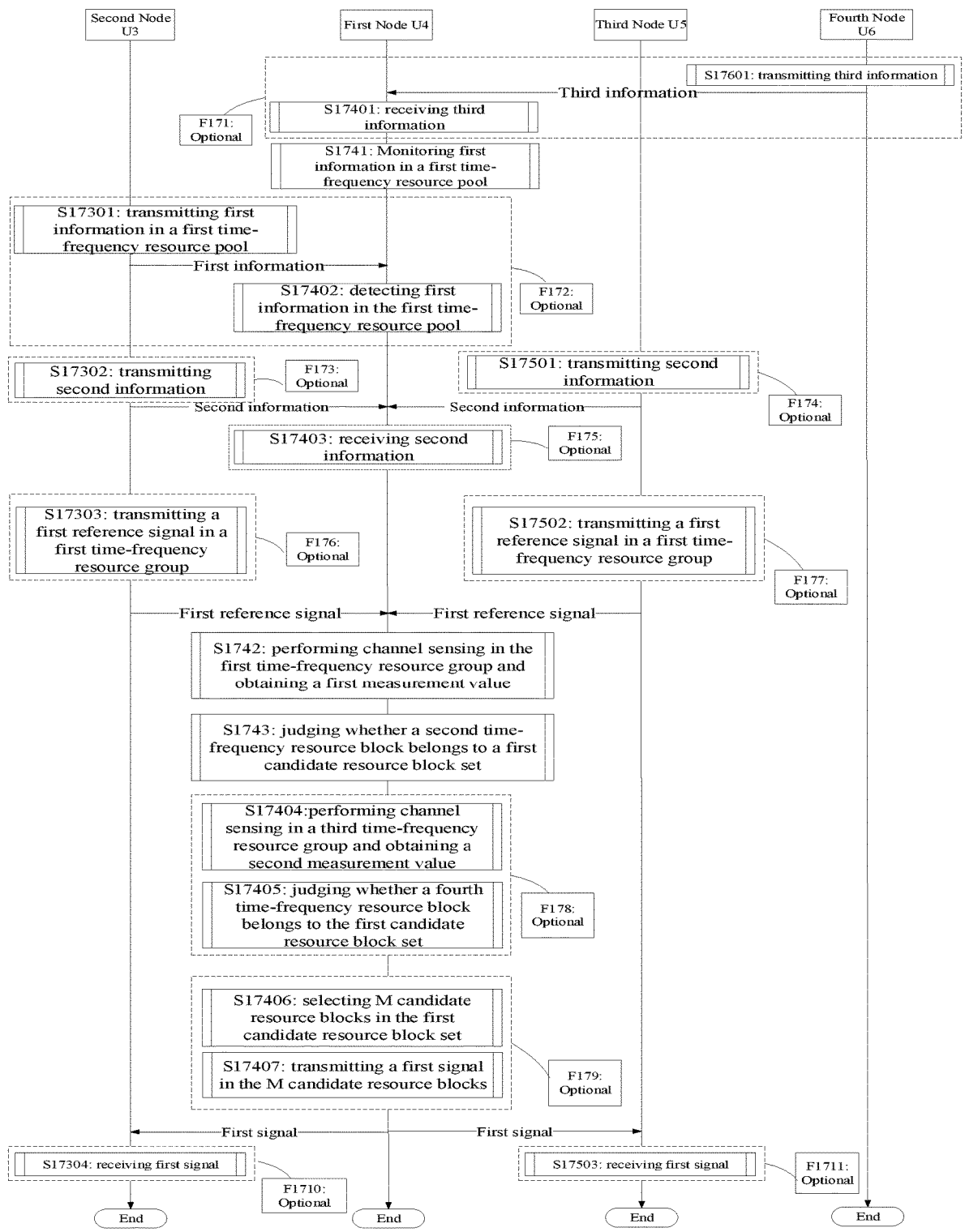
FIG. 17 is a flowchart of transmission according to one embodiment of the disclosure.

Embodiment 17 illustrates a flowchart of wireless transmission according to one embodiment of the disclosure, as shown in FIG. 17. In FIG. 17, a second node U3, a first node U4, a third node U5 and a fourth node U6 are communication nodes that perform communication with each other through an air interface. In FIG. 17, steps in boxes F171 to F1711 are optional.

The second node U3 transmits first information in a first time-frequency resource pool in S17301, transmits second information in S17302, transmits a first reference signal in a first time-frequency resource group in S17303, and receives a first signal in S17304.

The first node U4 receives third information in S17401, monitors first information in a first time-frequency resource pool in S1741, detects the first information in the first time-frequency resource pool in S17402, receives second information in S17403, performs channel sensing in the first time-frequency resource group and obtains a first measurement value in S1742, judges whether a second time-frequency resource block belongs to a first candidate resource block set in S1743, performs channel sensing in a third time-frequency resource group and obtains a second measurement value in S17404, judges whether a fourth time-frequency resource block belongs to the first candidate resource block set in S17405, selects M candidate resource blocks in the first candidate resource block set in S17406, and transmits a first signal in the M candidate resource blocks in S17407.

The third node U5 transmits second information in S17501, transmits a first reference signal in a first time-frequency resource group in S17502, and receives a first signal in S17503.

The fourth node U6 transmits third information in S17601.

In Embodiment 17, when the first measurement value is greater than a target threshold, the first node U4 judges that the second time-frequency resource block does not belong to the first candidate resource block set; when the first measurement value is not greater than the target threshold, the first node U4 judges that the second time-frequency resource block belongs to the first candidate resource block set. The first information indicates that a third time-frequency resource block is reserved for first control information, the first control information is used for indicating whether a first transport block is correctly received, the second time-frequency resource block includes the third time-frequency resource block; the target threshold is related to whether the first node U4 detects the first information in the first time-frequency resource pool; the first time-frequency resource group is associated to the second time-frequency resource block. The second information indicates that a second time-frequency resource group is reserved; the second time-frequency resource block is non-orthogonal to the second time-frequency resource group. The third time-frequency resource group belongs to the second time-frequency resource group, the fourth time-frequency resource block is non-orthogonal to the second time-frequency resource group; the third time-frequency resource block is orthogonal to the fourth time-frequency resource block in time-frequency domain. The third information is used by the first node U4 to determine the first time-frequency resource pool.

In one embodiment, the first node U4 is the first node in the disclosure.

In one embodiment, the second node U3 is the second node in the disclosure.

In one embodiment, an air interface between the second node U3 and the first node U4 is a PC5 interface.

In one embodiment, an air interface between the second node U3 and the first node U4 includes sidelink.

In one embodiment, an air interface between the second node U3 and the first node U4 includes an air interface between a UE and a UE.

In one embodiment, an air interface between the second node U3 and the first node U4 includes an air interface between a UE and a relay node.

In one embodiment, an air interface between the third node U5 and the first node U4 is a PC5 interface.

In one embodiment, an air interface between the third node U5 and the first node U4 includes sidelink.

In one embodiment, an air interface between the third node U5 and the first node U4 includes an air interface between a UE and a UE.

In one embodiment, an air interface between the third node U5 and the first node U4 includes an air interface between a UE and a relay node.

In one embodiment, an air interface between the first node U4 and the fourth node U6 is a Uu interface.

In one embodiment, an air interface between the first node U4 and the fourth node U6 includes downlink and uplink.

In one embodiment, the third node U5 is a UE.

In one embodiment, the third node U5 is a relay node.

In one embodiment, the fourth node U6 is a base station.

In one embodiment, the fourth node U6 is a relay node.

In one embodiment, the first time-frequency resource group is related to whether the first information is detected in the first time-frequency resource pool.

In one embodiment, the first node U4 detects a first signaling in the first time-frequency resource pool, and the first signaling carries the first information.

In one embodiment, the first signaling indicates the first time-frequency resource group, and the first transport block is transmitted in the first time-frequency resource group.

In one embodiment, a measurement for the first reference signal is used by the first node U4 to generate the first measurement value.

In one embodiment, the first candidate resource block set includes M0 candidate resource blocks, any one of the M candidate resource blocks is one of the M0 candidate resource blocks.

In one embodiment, when the second measurement value is greater than a third threshold, the first node U4 judges that a fourth time-frequency resource block does not belong to the first candidate resource block set; when the second measurement value is not greater than the third threshold, the first node U4 judges that the fourth time-frequency resource block belongs to the first candidate resource block set.

In one embodiment, steps in boxes F173 and F174 shown in FIG. 17 cannot exist simultaneously.

In one embodiment, a transmitter of the second information is the second node U3.

In one embodiment, a transmitter of the second information is the third node U5.

In one embodiment, steps in boxes F176 and F177 shown in FIG. 17 cannot exist simultaneously.

In one embodiment, a transmitter of the first reference signal is the second node U3.

In one embodiment, a transmitter of the first reference signal is the third node U5.

Embodiment 18

Figure 18:
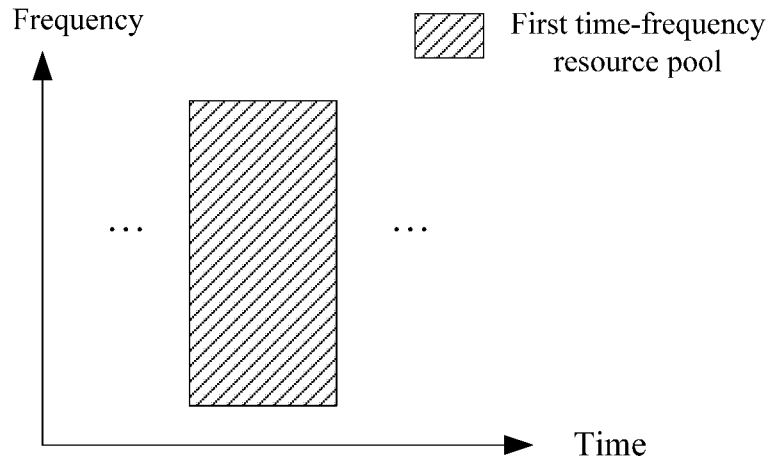
FIG. 18 is a diagram illustrating a first time-frequency resource pool according to one embodiment of the disclosure.

Embodiment 18 illustrates a diagram of a first time-frequency resource pool according to one embodiment of the disclosure, as shown in FIG. 18. In Embodiment 18, the first time-frequency resource pool includes a positive integer number of Resource Elements (REs).

In one embodiment, one RE occupies one multicarrier symbol in time domain, and occupies one subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first time-frequency resource pool includes a positive integer number of multicarrier symbols in time domain.

In one embodiment, the first time-frequency resource pool includes a positive integer number of inconsecutive multicarrier symbols in time domain.

In one embodiment, the first time-frequency resource pool includes a positive integer number of slots in time domain.

In one embodiment, the first time-frequency resource pool includes a positive integer number of inconsecutive slots in time domain.

In one embodiment, the first time-frequency resource pool includes a positive integer number of subframes in time domain.

In one embodiment, the first time-frequency resource pool includes a positive integer number of subcarriers in frequency domain.

In one embodiment, the first time-frequency resource pool includes a positive integer number of Physical Resource Blocks (PRBs) in frequency domain.

In one embodiment, the first time-frequency resource pool includes a positive integer number of consecutive Physical Resource Blocks (PRBs) in frequency domain.

In one embodiment, the first time-frequency resource pool includes a positive integer number of inconsecutive Physical Resource Blocks (PRBs) in frequency domain.

In one embodiment, the first time-frequency resource pool includes a positive integer number of sub-channels in frequency domain.

In one embodiment, the first time-frequency resource pool is configured by a higher layer signaling.

In one embodiment, the first time-frequency resource pool is predefined.

In one embodiment, the first time-frequency resource pool is preconfigured.

In one embodiment, the first time-frequency resource pool appears many times in time domain.

In one embodiment, the first time-frequency resource pool appears only once in time domain.

Embodiment 19

Figure 19:
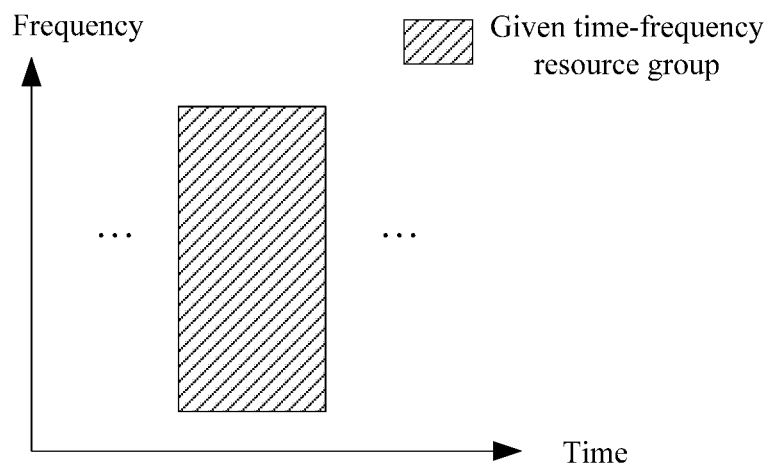
FIG. 19 is a diagram illustrating a given time-frequency resource group according to one embodiment of the disclosure.

Embodiment 19 illustrates a diagram of a given time-frequency resource group according to one embodiment of the disclosure, as shown in FIG. 19. In Embodiment 19, the given time-frequency resource group is any one of the first time-frequency resource group, the second time-frequency resource group and the third time-frequency resource group in the disclosure.

In one embodiment, the given time-frequency resource group includes a positive integer number of REs.

In one embodiment, the given time-frequency resource group includes a positive integer number of multicarrier symbols in time domain.

In one embodiment, the given time-frequency resource group includes a positive integer number of inconsecutive multicarrier symbols in time domain.

In one embodiment, the given time-frequency resource group includes a positive integer number of slots in time domain.

In one embodiment, the given time-frequency resource group includes a positive integer number of inconsecutive slots in time domain.

In one embodiment, the given time-frequency resource group includes a positive integer number of subframes in time domain.

In one embodiment, the given time-frequency resource group appears many times in time domain.

In one subembodiment, any two adjacent given time-frequency resource groups have an equal time interval in time domain.

In one embodiment, the given time-frequency resource group appears only once in time domain.

In one embodiment, the given time-frequency resource group includes a positive integer number of subcarriers in frequency domain.

In one embodiment, the given time-frequency resource group includes a positive integer number of PRBs in frequency domain.

In one embodiment, the given time-frequency resource group includes a positive integer number of subchannels in frequency domain.

In one embodiment, the given time-frequency resource group belongs to a sensing window in time domain.

In one embodiment, the given time-frequency resource group is the first time-frequency resource group.

In one embodiment, the given time-frequency resource group is the second time-frequency resource group.

In one embodiment, the given time-frequency resource group is the third time-frequency resource group.

Embodiment 20

Figure 20:
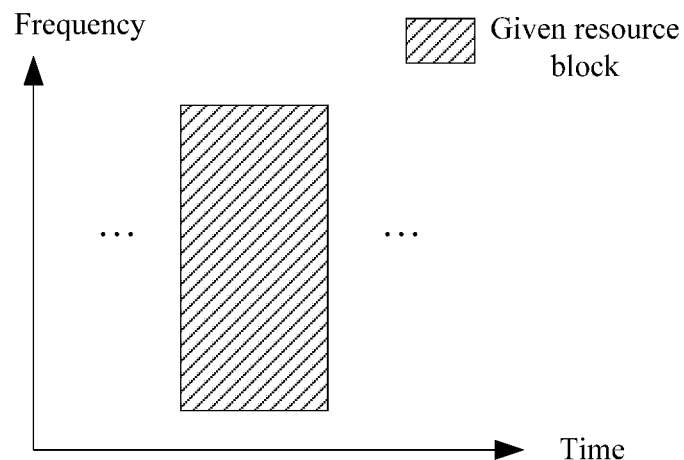
FIG. 20 is a diagram illustrating a given resource block according to one embodiment of the disclosure.

Embodiment 20 illustrates a diagram of a given resource block according to one embodiment of the disclosure, as shown in FIG. 20. In Embodiment 20, the given resource block is any one resource block among the M0 candidate resource blocks, the second time-frequency resource block, the third time-frequency resource block and the fourth time-frequency resource block in the disclosure.

In one embodiment, the given resource block includes a positive integer number of REs.

In one embodiment, the given resource block includes a positive integer number of multicarrier symbols in time domain.

In one embodiment, the given resource block includes a positive integer number of slots in time domain.

In one embodiment, the given resource block includes one slot in time domain.

In one embodiment, the given resource block includes a positive integer number of subframes in time domain.

In one embodiment, the given resource block includes one subframe in time domain.

In one embodiment, the given resource block includes a positive integer number of subcarriers in frequency domain.

In one embodiment, the given resource block includes a positive integer number of PRBs in frequency domain.

In one embodiment, the given resource block includes a positive integer number of consecutive PRBs in frequency domain.

In one embodiment, the given resource block includes a positive integer number of inconsecutive PRBs in frequency domain.

In one embodiment, the given resource block includes a positive integer number of subchannels in frequency domain.

In one embodiment, the given resource block belongs to a selection window in time domain.

In one embodiment, two of the M0 candidate resource blocks include different numbers of REs.

In one embodiment, any two of the M0 candidate resource blocks include a same number of REs.

In one embodiment, the given resource block is any one of the M0 candidate resource blocks.

In one embodiment, the given resource block is the second time-frequency resource block.

In one embodiment, the given resource block is the third time-frequency resource block.

In one embodiment, the given resource block is the fourth time-frequency resource block.

Embodiment 21

Embodiment 21 illustrates a diagram of a scenario in which a target threshold is related to whether first information is detected in a first time-frequency resource pool according to one embodiment of the disclosure, as shown in FIG. 21. In Embodiment 21, when the first information is detected in the first time-frequency resource pool, the target threshold is the first threshold; when the first information is not detected in the first time-frequency resource pool, the target threshold is the second threshold; the first threshold is not equal to the second threshold.

In one embodiment, the phrase that the target threshold is related to whether the first information is detected in the first time-frequency resource pool includes: when the first node detects the first information in the first time-frequency resource pool, the target threshold is a first threshold; when the first node does not detect the first information in the first time-frequency resource pool, the target threshold is a second threshold; the first threshold is not equal to the second threshold.

In one embodiment, the first threshold is less than the second threshold.

In one embodiment, the first threshold is greater than the second threshold.

In one embodiment, the first threshold and the second threshold are preconfigured respectively.

In one embodiment, the first threshold and the second threshold are configured by a higher layer parameter respectively.

In one embodiment, the first threshold and the second threshold are related to the first priority set respectively.

Embodiment 22

Embodiment 22 illustrates a diagram of a scenario in which a target threshold is related to whether first information is detected in a first time-frequency resource pool according to one embodiment of the disclosure, as shown in FIG. 22. In Embodiment 22, when the first information is detected in the first time-frequency resource pool, the target threshold belongs to a first threshold set; when the first information is not detected in the first time-frequency resource pool, the target threshold belongs to a second threshold set; the first threshold set and the second threshold set include a positive integer number of thresholds respectively.

In one embodiment, the phrase that the target threshold is related to whether the first information is detected in the first time-frequency resource pool includes: when the first node detects the first information in the first time-frequency resource pool, the target threshold belongs to a first threshold set; when the first node does not detect the first information in the first time-frequency resource pool, the target threshold belongs to a second threshold set; the first threshold set and the second threshold set include a positive integer number of thresholds respectively.

In one embodiment, one threshold in the first threshold set does not belong to the second threshold set.

In one embodiment, one threshold in the second threshold set does not belong to the first threshold set.

In one embodiment, the first threshold set and the second threshold set are preconfigured respectively.

In one embodiment, the first threshold set and the second threshold set are configured by a higher layer parameter respectively.

In one embodiment, when the first information is detected in the first time-frequency resource pool, the first priority set is used for determining the target threshold from the first threshold set; when the first information is not detected in the first time-frequency resource pool, the first priority set is used for determining the target threshold from the second threshold set.

Embodiment 23

Embodiment 23 illustrates a diagram of a scenario in which a first time-frequency resource group is associated to a second time-frequency resource block according to one embodiment of the disclosure, as shown in FIG. 23.

In one embodiment, the phrase that the first time-frequency resource group is associated to the second time-frequency resource block includes: the channel sensing performed in the first time-frequency resource group is used for determining whether the second time-frequency resource block belongs to the first candidate resource block set.

In one embodiment, the phrase that the first time-frequency resource group is associated to the second time-frequency resource block includes: the first time-frequency resource group and the second time-frequency resource block are reserved by one same signaling.

In one embodiment, the phrase that the first time-frequency resource group is associated to the second time-frequency resource block includes: the first time-frequency resource group and the third time-frequency resource block in the disclosure are reserved by one same signaling.

In one embodiment, the phrase that the first time-frequency resource group is associated to the second time-frequency resource block includes: the first signaling in the disclosure indicates the first time-frequency resource group and the second time-frequency resource block.

In one subembodiment, the first signaling indicates explicitly the second time-frequency resource block.

In one subembodiment, the first signaling indicates implicitly the second time-frequency resource block.

In one embodiment, the phrase that the first time-frequency resource group is associated to the second time-frequency resource block includes: the first signaling in the disclosure indicates the first time-frequency resource group and the third time-frequency resource block in the disclosure.

In one subembodiment, the first signaling indicates explicitly the third time-frequency resource block.

In one subembodiment, the first signaling indicates implicitly the third time-frequency resource block.

In one embodiment, the phrase that the first time-frequency resource group is associated to the second time-frequency resource block includes: the first transport block in the disclosure is transmitted in the first time-frequency resource group.

In one embodiment, the phrase that the first time-frequency resource group is associated to the second time-frequency resource block includes: the first time-frequency resource group and the second time-frequency resource block both belong to the second time-frequency resource group in the disclosure.

In one embodiment, the phrase that the first time-frequency resource group is associated to the second time-frequency resource block includes: the first time-frequency resource group belongs to the second time-frequency resource group in the disclosure, the second time-frequency resource block is non-orthogonal to the second time-frequency resource group.

Embodiment 24

Embodiment 24 illustrates a diagram of a scenario in which a first time-frequency resource group is related to whether first information is detected in a first time-frequency resource pool, as shown in FIG. 24.

In one embodiment, when the first information is detected in the first time-frequency resource pool, the first time-frequency resource group does not belong to the second time-frequency resource group in the disclosure; when the first information is not detected in the first time-frequency resource pool, the first time-frequency resource group belongs to the second time-frequency resource group.

In one embodiment, when the first information is detected in the first time-frequency resource pool, the first time-frequency resource group is reserved for K1 transport blocks, the first transport block in the disclosure is one of the K1 transport blocks; when the first information is not detected in the first time-frequency resource pool, the first time-frequency resource group is reserved for K2 transport blocks, any one of the K1 transport blocks is different from any one of the K2 transport blocks, K1 and K2 are positive integers respectively.

In one subembodiment, any one of the K1 transport blocks is not equal to any one of the K2 transport block sizes in terms of transport block size.

In one embodiment, when the first information is detected in the first time-frequency resource pool, the first time-frequency resource group is indicated by the first signaling in the disclosure; when the first information is not detected in the first time-frequency resource pool, the first time-frequency resource group is indicated by another signaling other than the first signaling.

In one embodiment, when the first information is detected in the first time-frequency resource pool, the first time-frequency resource group includes time-frequency resources occupied by the first transport block.

In one embodiment, when the first information is detected in the first time-frequency resource pool, the first time-frequency resource group is composed of time-frequency resources occupied by the first transport block.

In one embodiment, when the first information is detected in the first time-frequency resource pool, the first time-frequency resource group is reserved by a given node; when the first information is not detected in the first time-frequency resource pool, the first time-frequency resource group is reserved by another node other than the given node.

Embodiment 25

Embodiment 25 illustrates a diagram of a first signaling and first information according to one embodiment of the disclosure, as shown in FIG. 25. In Embodiment 25, the first node in the disclosure detects the first signaling in the first time-frequency resource pool in the disclosure, and the first signaling carries the first information.

In one embodiment, the phrase of detecting the first information includes: detecting the first signaling.

In one embodiment, the phrase of detecting the first information includes: detecting a given signaling, and the given signaling carries the first information.

In one embodiment, the phrase of detecting a first signaling refers to: performing a coherent reception in the first time-frequency resource pool, and an energy of a signal obtained after the coherent reception is greater than a first given threshold.

In one embodiment, the phrase of detecting a first signaling refers to: receiving a signal in the first time-frequency resource pool and performing a decoding operation, and determining that the decoding is correct according to CRC bits.

In one embodiment, the first signaling is unicast transmission.

In one embodiment, the first signaling is groupcast transmission.

In one embodiment, the first signaling is UE-specific.

In one embodiment, the first signaling is a dynamic signaling.

In one embodiment, the first signaling is a Layer 1 (L1) signaling.

In one embodiment, the first signaling is a Layer 1 (L1) control signaling.

In one embodiment, the first signaling includes an SCI.

In one embodiment, the first signaling includes one or more fields in one SCI.

In one embodiment, the first signaling is transmitted on a sidelink.

In one embodiment, the first signaling is transmitted through a PC5 interface.

In one embodiment, the phrase that the first signaling carries the first information includes: the first signaling indicates explicitly the first information.

In one embodiment, the phrase that the first signaling carries the first information includes: the first signaling indicates implicitly the first information.

In one embodiment, the first signaling indicates the third time-frequency resource block in the disclosure.

In one embodiment, the first signaling indicates explicitly the third time-frequency resource block in the disclosure.

In one embodiment, the first signaling indicates implicitly the third time-frequency resource block in the disclosure.

In one embodiment, time domain resources occupied by the third time-frequency resource block in the disclosure are related to time domain resources occupied by the first signaling.

In one embodiment, time domain resources occupied by the first signaling are used for determining time domain resources occupied by the third time-frequency resource block in the disclosure.

In one embodiment, a time interval between time domain resources occupied by the first signaling and time domain resources occupied by the third time-frequency resource block in the disclosure is preconfigured.

In one embodiment, a time interval between time domain resources occupied by the first signaling and time domain resources occupied by the third time-frequency resource block in the disclosure is configured by a higher layer signaling.

In one embodiment, frequency domain resources occupied by the third time-frequency resource block in the disclosure are related to frequency domain resources occupied by the first signaling.

In one embodiment, frequency domain resources occupied by the first signaling are used for determining frequency domain resources occupied by the third time-frequency resource block in the disclosure.

In one embodiment, the first signaling indicates a first index, and the first index is used for determining the third time-frequency resource block in the disclosure.

In one subembodiment, the first index includes a HARQ process number.

In one subembodiment, the first index includes an L1 destination ID.

In one subembodiment, the first index includes an L1 source ID.

In one subembodiment, the first index includes an ID of a target receiver of the first transport block.

In one subembodiment, the first index includes an ID of a transmitter of the first transport block.

In one embodiment, the first signaling includes configuration information of a first data channel, the first transport block is transmitted on the first data channel, and the configuration information of the first data channel includes one or more of occupied time domain resources, occupied frequency domain resources, a Modulation and Coding Scheme (MCS), DeModulation Reference Signal (DMRS) configuration information, a Hybrid Automatic Repeat reQuest (HARQ) process number, a Redundancy Version (RV), and a New Data Indicator (NDI)

In one subembodiment, the first data channel is a PSSCH.

In one subembodiment, the first data channel is a Physical Uplink Shared CHannel (PUSCH).

In one embodiment, the first signaling is transmitted on a PUCCH.

In one embodiment, the first signaling is transmitted on a PSCCH.

Embodiment 26

Embodiment 26 illustrates a diagram of a scenario in which a first signaling indicates a first time-frequency resource group according to one embodiment of the disclosure, as shown in FIG. 26.

In one embodiment, the first signaling indicates the first time-frequency resource group, and the first transport block is transmitted in the first time-frequency resource group.

In one embodiment, the first signaling indicates explicitly the first time-frequency resource group.

In one embodiment, the first signaling indicates implicitly the first time-frequency resource group.

In one embodiment, the first signaling indicates that the first time-frequency resource group is reserved.

In one embodiment, the first time-frequency resource group is reserved for K transport blocks, the K being a positive integer; the first transport block is one of the K transport blocks.

In one embodiment, time-frequency resources occupied by the first signaling belong to the first time-frequency resource group.

In one embodiment, time-frequency resources occupied by the first signaling do not belong to the first time-frequency resource group.

Embodiment 27

Embodiment 27 illustrates a diagram of a first reference signal according to one embodiment of the disclosure, as shown in FIG. 27. In Embodiment 27, the first reference signal is transmitted in the first time-frequency resource group, and a measurement for the first reference signal is used for generating the first measurement value.

In one embodiment, the first reference signal includes a sidelink (SL) reference signal (RS).

In one embodiment, the first reference signal includes a Channel-State Information Reference Signal (CSI-RS).

In one embodiment, the first reference signal includes an SL CSI-RS.

In one embodiment, the first reference signal includes a Sounding Reference Signal (SRS).

In one embodiment, the first reference signal includes an SL SRS.

In one embodiment, the first reference signal includes a DMRS.

In one embodiment, the first reference signal includes an SL DMRS.

In one embodiment, the first reference signal is transmitted on a sidelink.

In one embodiment, the first reference signal is transmitted through a PC5 interface.

In one embodiment, the first reference signal occupies partial REs in the first time-frequency resource group only.

In one embodiment, the first reference signal occupies all REs in the first time-frequency resource group.

In one embodiment, the first reference signal includes a DMRS of a first control channel.

In one subembodiment, the first control channel carries the first signaling.

In one subembodiment, the first control channel carries the second information.

In one subembodiment, the first control channel is a PSCCH.

In one embodiment, the first reference signal includes a DMRS of a second data channel.

In one subembodiment, the first signaling includes configuration information of the second data channel.

In one subembodiment, the second information includes configuration information of the second data channel.

In one subembodiment, the first transport block is transmitted on the second data channel.

In one subembodiment, the second data channel is transmitted in the first time-frequency resource group.

In one subembodiment, the second data channel is transmitted in the second time-frequency resource group.

In one subembodiment, the second data channel is a PSSCH.

In one embodiment, the first information is detected in the first time-frequency resource pool, and a transmitter of the first reference signal is a transmitter of the first information.

In one embodiment, the first information is detected in the first time-frequency resource pool, and a transmitter of the first reference signal is not a transmitter of the first information.

In one embodiment, the channel sensing includes: receiving the first reference signal, and measuring an average receiving power of the first reference signal.

In one embodiment, the channel sensing includes: performing a coherent reception of the first reference signal, and measuring an average receiving power of a signal obtained after the coherent reception.

In one embodiment, the first measurement value includes an RSRP of the first reference signal.

In one embodiment, the first measurement value includes an RSRQ of the first reference signal.

In one embodiment, the first measurement value includes an RSSI of the first reference signal.

Embodiment 28

Embodiment 28 illustrates a diagram of a first candidate resource block set and M candidate resource blocks according to one embodiment of the disclosure, as shown in FIG. 28. In Embodiment 28, the first node selects the M candidate resource blocks in the first candidate resource block set, and transmits the first signal in the M candidate resource blocks. The first candidate resource block set includes M0 candidate resource blocks, any one of the M candidate resource blocks is one of the M0 candidate resource blocks. In FIG. 28, the M0 candidate resource blocks are indexed with #0, . . . , #M0−1 respectively.

In one embodiment, the M is equal to 1.

In one embodiment, the M is greater than 1.

In one embodiment, the M0 is equal to 1.

In one embodiment, the M0 is greater than 1.

In one embodiment, the first node selects the M candidate resource blocks in the first candidate resource block set autonomously.

In one embodiment, the first node selects the M candidate resource blocks in the first candidate resource block set randomly.

In one embodiment, the M0 candidate resource blocks are one-to-one corresponding to M0 measurements, the M candidate resource blocks are composed of M candidate resource blocks in the first candidate resource block set that are corresponding to a lowest measurement value.

In one embodiment, the first node selects the M candidate resource blocks in a first candidate resource block subset randomly, the M0 candidate resource blocks are one-to-one corresponding to M0 measurements, the first candidate resource block subset is composed of M1 candidate resource blocks in the first candidate resource block set that are corresponding to a lowest measurement value, and M1 is a positive integer less than the M0 but not less than the M.

In one embodiment, the M0 measurements are an RSSI respectively.

In one embodiment, the M0 measurements are an RSRP respectively.

In one embodiment, the first signal is one radio signal.

In one embodiment, the first signal is one baseband signal.

In one embodiment, the first signal carries one TB.

In one embodiment, the first signal carries an CSI.

In one embodiment, the first signal is transmitted on a sidelink.

In one embodiment, the first signal is transmitted through a PC5 interface.

In one embodiment, the first signal is transmitted on a PUSCH.

In one embodiment, the first signal is transmitted on a PSSCH.

Embodiment 29

Embodiment 29 illustrates a diagram of second information and a second time-frequency resource group according to one embodiment of the disclosure, as shown in FIG. 29. In Embodiment 29, the second information indicates that the second time-frequency resource group is reserved, the second time-frequency resource block is non-orthogonal to the second time-frequency resource group.

In one embodiment, the second information is dynamic information.

In one embodiment, the second information is L1 information.

In one embodiment, the second information is L1 control information.

In one embodiment, the second information is carried by a physical layer signaling.

In one embodiment, the second information is carried by an L1 signaling.

In one embodiment, the second information is carried by an L1 control signaling.

In one embodiment, the second information includes an SCI.

In one embodiment, the second information includes one or more fields in one SCI.

In one embodiment, the second information includes information carried by one or more fields in one SCI.

In one embodiment, the second information is transmitted on a sidelink.

In one embodiment, the second information is transmitted through a PC5 interface.

In one embodiment, the first signaling carries the second information.

In one embodiment, the second information is carried by a signaling other than the first signaling.

In one embodiment, a transmitter of the second information is different from a transmitter of the first information.

In one embodiment, a transmitter of the second information is a transmitter of the first information.

In one embodiment, the second information and the first information are carried by different signalings, and the second information is earlier than the first information.

In one embodiment, the second information and the first information are carried by different signalings, and the second information is later than the first information.

In one embodiment, the phrase that the second time-frequency resource group is reserved includes: a transmitter of the second information does not need to perform the channel sensing before transmitting a radio signal in the second time-frequency resource group.

In one embodiment, the second time-frequency resource group is reserved for K3 transport blocks, K3 being a positive integer; the first transport block is one of the K3 transport blocks.

In one embodiment, the second time-frequency resource group is reserved for K3 transport blocks, K3 being a positive integer; the first transport block is not one of the K3 transport blocks.

In one embodiment, the second time-frequency resource block belongs to the second time-frequency resource group.

In one embodiment, the second time-frequency resource block and the second time-frequency resource group are partially overlapped.

In one embodiment, the second time-frequency resource block and the second time-frequency resource group are overlapped.

In one embodiment, the second information is transmitted on a PUCCH.

In one embodiment, the second information is transmitted on a PSCCH.

In one embodiment, the first time-frequency resource group belongs to the second time-frequency resource group.

In one embodiment, the first information is not detected in the first time-frequency resource pool, and the first time-frequency resource group belongs to the second time-frequency resource group.

In one embodiment, the second time-frequency resource group appears many times in time domain, and the first time-frequency resource group includes one time of appearance of the second time-frequency resource group in time domain.

In one embodiment, the first time-frequency resource group does not belong to the second time-frequency resource group.

In one embodiment, the first information is detected in the first time-frequency resource pool, and the first time-frequency resource group does not belong to the second time-frequency resource group.

In one embodiment, the first information is detected in the first time-frequency resource pool, and the first time-frequency resource group belongs to the second time-frequency resource group.

Embodiment 30

Embodiment 30 illustrates a diagram of a third time-frequency resource group, a fourth time-frequency resource block and a third time-frequency resource block according to one embodiment of the disclosure, as shown in FIG. 30. In Embodiment 30, the first node performs the channel sensing in the third time-frequency resource group and obtains the second measurement value; the second measurement value is used for judging whether the fourth time-frequency resource block belongs to the first candidate resource block set. The third time-frequency resource group belongs to the second time-frequency resource group, the fourth time-frequency resource block is non-orthogonal to the second time-frequency resource group; the third time-frequency resource block is orthogonal to the fourth time-frequency resource block in time-frequency domain.

In one embodiment, the second measurement value includes an RSRP.

In one embodiment, the second measurement value includes an RSRQ.

In one embodiment, the second measurement value includes an RSSI.

In one embodiment, the second measurement value is in unit of Watt.

In one embodiment, the third threshold is in unit of Watt.

In one embodiment, the second measurement value is in unit of dBm.

In one embodiment, the third threshold is in unit of dBm.

In one embodiment, the third threshold is unrelated to whether the first information is detected in the first time-frequency resource pool.

In one embodiment, the third time-frequency resource group is the second time-frequency resource group.

In one embodiment, the third time-frequency resource group and the second time-frequency resource group are completely overlapped.

In one embodiment, the third time-frequency resource group and the second time-frequency resource group are partially overlapped.

In one embodiment, the third time-frequency resource group and the second time-frequency resource group are completely overlapped in frequency domain and partially overlapped in time domain.

In one embodiment, the fourth time-frequency resource block belongs to the second time-frequency resource group.

In one embodiment, the fourth time-frequency resource block and the second time-frequency resource group are overlapped.

In one embodiment, the fourth time-frequency resource block and the second time-frequency resource group are partially overlapped.

In one embodiment, the fourth time-frequency resource block and the third time-frequency resource block belong to one same slot in time domain.

In one embodiment, the fourth time-frequency resource block and the third time-frequency resource block belong to one same subframe in time domain.

In one embodiment, the fourth time-frequency resource block is orthogonal to the third time-frequency resource group in time domain.

In one embodiment, the fourth time-frequency resource block is later than the third time-frequency resource group in time domain.

In one embodiment, the fourth time-frequency resource block is earlier than the third time-frequency resource block in time domain.

In one subembodiment, an end time of the fourth time-frequency resource block is not later than a start time of the third time-frequency resource block.

In one subembodiment, the fourth time-frequency resource block and the third time-frequency resource block occupy orthogonal frequency domain resources.

In one subembodiment, the fourth time-frequency resource block and the third time-frequency resource block occupy overlapped frequency domain resources.

In one subembodiment, frequency domain resources occupied by the fourth time-frequency resource block include frequency domain resources occupied by the third time-frequency resource block.

In one subembodiment, the fourth time-frequency resource block is orthogonal to the second time-frequency resource block in time domain.

In one subembodiment, the fourth time-frequency resource block is earlier than the second time-frequency resource block in time domain.

In one subembodiment, the fourth time-frequency resource block does not include a PSFCH.

In one subembodiment, the first information is detected in the first time-frequency resource pool, and the target threshold is less than the third threshold.

In one subembodiment, the first information is detected in the first time-frequency resource pool, the fourth time-frequency resource block does not include a PSFCH, the target threshold is less than the third threshold.

In one subembodiment, the target threshold is equal to the third threshold.

In one subembodiment, when the first information is detected in the first time-frequency resource pool, the second time-frequency resource block includes the third time-frequency resource block among the third time-frequency resource block and the fourth time-frequency resource block only; when the first information is not detected in the first time-frequency resource pool, the second time-frequency resource block includes the third time-frequency resource block and the fourth time-frequency resource block.

Embodiment 31

Embodiment 31 illustrates a diagram of a third time-frequency resource group, a fourth time-frequency resource block and a third time-frequency resource block according to one embodiment of the disclosure, as shown in FIG. 31.

In one embodiment, the third time-frequency resource block is non-orthogonal to the fourth time-frequency resource block in time domain.

In one embodiment, the third time-frequency resource block and the fourth time-frequency resource block occupy overlapped time domain resources.

In one embodiment, the fourth time-frequency resource block is non-orthogonal to the second time-frequency resource block in time domain.

In one embodiment, the fourth time-frequency resource block and the second time-frequency resource block occupy overlapped time domain resources.

Embodiment 32

Embodiment 32 illustrates a diagram of third information according to one embodiment of the disclosure, as shown in FIG. 32. In Embodiment 32, the third information is used for determining the first time-frequency resource pool.

In one embodiment, the third information is indicated by a higher layer parameter.

In one embodiment, the third information is carried by a higher layer signaling.

In one embodiment, the third information is carried by an RRC signaling.

In one embodiment, the third information is transmitted on a PDSCH.

In one embodiment, the third information is transmitted on a PDCCH.

In one embodiment, the third information is transmitted on a PSSCH.

In one embodiment, the third information is transmitted on a PSCCH.

In one embodiment, the third information indicates the first time-frequency resource pool.

In one embodiment, the third information indicates explicitly the first time-frequency resource pool.

In one embodiment, the third information indicates implicitly the first time-frequency resource pool.

In one embodiment, the third information indicates time domain resources occupied by the first time-frequency resource pool.

In one embodiment, the third information indicates frequency domain resources occupied by the first time-frequency resource pool.

Embodiment 33

Embodiment 33 illustrates a structure block diagram of a processing device in a first node according to one embodiment of the disclosure, as shown in FIG. 33. In FIG. 33, the processing device 3300 in the first node includes a first receiver 3301 and a first processor 3302.

In Embodiment 33, the first receiver 3301 monitors first information in a first time-frequency resource pool, performs channel sensing in a first time-frequency resource group and obtains a first measurement value; and the first processor 3302, when the first measurement value is greater than a target threshold, judges that a second time-frequency resource block does not belong to a first candidate resource block set; when the first measurement value is not greater than the target threshold, judges that the second time-frequency resource block belongs to the first candidate resource block set.

In Embodiment 33, the first information indicates that a third time-frequency resource block is reserved for first control information, the first control information is used for indicating whether a first transport block is correctly received, the second time-frequency resource block includes the third time-frequency resource block; the target threshold is related to whether the first information is detected in the first time-frequency resource pool; the first time-frequency resource group is associated to the second time-frequency resource block.

In one embodiment, the first time-frequency resource group is related to whether the first information is detected in the first time-frequency resource pool.

In one embodiment, the first receiver 3301 detects a first signaling in the first time-frequency resource pool, wherein the first receiver 3301 detects the first information in the first time-frequency resource pool, and the first signaling carries the first information.

In one embodiment, the first signaling indicates the first time-frequency resource group; and the first transport block is transmitted in the first time-frequency resource group.

In one embodiment, a first reference signal is transmitted in the first time-frequency resource group; a measurement for the first reference signal is used for generating the first measurement value.

In one embodiment, the first processor 3302 selects M candidate resource block(s) in the first candidate resource block set and transmits a first signal in the M candidate resource block(s), wherein M is a positive integer; and the first candidate resource block set includes M0 candidate resource block(s), any one of the M candidate resource block(s) is one of the M0 candidate resource block(s), and M0 is a positive integer not less than the M.

In one embodiment, the first receiver 3301 receives second information, wherein the second information indicates that a second time-frequency resource group is reserved; the second time-frequency resource block is non-orthogonal to the second time-frequency resource group.

In one embodiment, the first receiver 3301 performs the channel sensing in a third time-frequency resource group, and obtains a second measurement value; and the first processor 3302, when the second measurement value is greater than a third threshold, judges that a fourth time-frequency resource block does not belong to the first candidate resource block set; when the second measurement value is not greater than the third threshold, judges that the fourth time-frequency resource block belongs to the first candidate resource block set; wherein the first receiver 3301 detects the first information in the first time-frequency resource pool; the third time-frequency resource group belongs to the second time-frequency resource group, the fourth time-frequency resource block is non-orthogonal to the second time-frequency resource group; the third time-frequency resource block is orthogonal to the fourth time-frequency resource block in time-frequency domain.

In one embodiment, the first receiver 3301 receives third information, wherein the third information is used for determining the first time-frequency resource pool.

In one embodiment, the first node is UE.

In one embodiment, the first node is a relay node.

In one embodiment, the first receiver 3301 includes at least one of the antenna 452, the receiver 454, the receiving processor 456, the multiantenna receiving processor 458, the controller/processor 459, the memory 460 or the data source 467 in Embodiment 4.

In one embodiment, the first processor 3303 includes at least one of the antenna 452, the transmitter 454, the transmitting processor 468, the multiantenna transmitting processor 457, the controller/processor 459, the memory 460 or the data source 467 in Embodiment 4.

Embodiment 34

Embodiment 34 illustrates a structure block diagram of a processing device in a second node according to one embodiment of the disclosure, as shown in FIG. 34. In FIG. 34, the processing device 3400 in the second node includes a second processor 3401.

In Embodiment 34, the second processor 3401 transmits first information in a first time-frequency resource pool, or gives up transmitting the first information in the first time-frequency resource pool.

In Embodiment 34, the first information indicates that a third time-frequency resource block is reserved for first control information, the first control information is used for indicating whether a first transport block is correctly received, a second time-frequency resource block includes the third time-frequency resource block; a channel sensing performed in a first time-frequency resource group is used for determining a first measurement value; when the first measurement value is greater than a target threshold, the second time-frequency resource block is judged to not belong to a first candidate resource block set; when the first measurement value is not greater than the target threshold, the second time-frequency resource block is judged to belong to the first candidate resource block set; the target threshold is related to whether the first information is transmitted in the first time-frequency resource pool; the first time-frequency resource group is associated to the second time-frequency resource block.

In one embodiment, the first time-frequency resource group is related to whether the first information is transmitted in the first time-frequency resource pool.

In one embodiment, the second processor 3401 transmits a first signaling in the first time-frequency resource pool, wherein the second processor 3401 transmits the first information in the first time-frequency resource pool, and the first signaling carries the first information.

In one embodiment, the first signaling indicates the first time-frequency resource group; and the first transport block is transmitted in the first time-frequency resource group.

In one embodiment, the second processor 3401 transmits a first reference signal in the first time-frequency resource group, wherein a measurement for the first reference signal is used for generating the first measurement value.

In one embodiment, the second processor 3401 transmits second information, wherein the second information indicates that a second time-frequency resource group is reserved; the second time-frequency resource block is non-orthogonal to the second time-frequency resource group.

In one embodiment, the second node is UE.

In one embodiment, the second node is relay node.

In one embodiment, the second processor 3401 includes at least one of the antenna 420, the transmitter 418, the transmitting processor 416, the multiantenna transmitting processor 471, the controller/processor 475 or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IoT terminals, Machine Type Communication (MTC) terminals, enhanced MTC (eMTC) terminals, data cards, low-cost mobile phones, low-cost tablet computers, etc. The base station or system in the disclosure includes but not limited to macro-cellular base stations, micro-cellular base stations, home base stations, relay base stations, gNBs (NR Nodes B), Transmitter Receiver Points (TRPs) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, to monitor a first-type signaling and a second-type signaling in a first time-frequency resource pool and a second time-frequency resource pool respectively, and to receive a first signaling; and
a first transmitter, to transmit a first information block;
wherein the first signaling is used for determining the first information block; the first signaling comprises a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

2. The first node according to claim 1, wherein the first receiver receives a first bit block set, wherein the first signaling comprises scheduling information of the first bit block set; the first information block indicates whether each bit block in the first bit block set is correctly received.

3. The first node according to claim 1, wherein the first signaling is used for indicating a semi-persistent scheduling release, and the first information block indicates whether the first signaling is correctly received.

4. The first node according to claim 1, wherein the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

5. The first node according to claim 1, wherein the first information block comprises L information subblocks, L being a positive integer greater than 1; L signalings are one-to-one corresponding to the L information subblocks, the first signaling is one of the L signalings, and the first signaling is corresponding to a first information subblock among the L information subblocks.

6. The first node according to claim 5, wherein the L signalings are used for determining L second-type indexes respectively, and all the L second-type indexes have a same value.

7. The first node according to claim 1, wherein the first information block is transmitted on a first channel, and the first signaling is used for determining air interface resources occupied by the first channel.

8. A second node for wireless communication, comprising:
a second transmitter, to transmit a first signaling; and
a second receiver, to receive a first information block;
wherein the first signaling is used for determining the first information block; a first time-frequency resource pool and a second time-frequency resource pool are reserved for a first-type signaling and a second-type signaling respectively; the first signaling comprises a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

9. The second node according to claim 8, wherein the second transmitter transmits a first bit block set; wherein the first signaling comprises scheduling information of the first bit block set; the first information block indicates whether each bit block in the first bit block set is correctly received.

10. The second node according to claim 8, wherein the first signaling is used for indicating a semi-persistent scheduling release, and the first information block indicates whether the first signaling is correctly received.

11. The second node according to claim 8, wherein the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

12. The second node according to claim 8, wherein the first information block comprises L information subblocks, L being a positive integer greater than 1; L signalings are one-to-one corresponding to the L information subblocks, the first signaling is one of the L signalings, and the first signaling is corresponding to a first information subblock among the L information subblocks.

13. The second node according to claim 12, wherein the L signalings are used for determining L second-type indexes respectively, and all the L second-type indexes have a same value.

14. The second node according to claim 8, wherein the first information block is transmitted on a first channel, and the first signaling is used for determining air interface resources occupied by the first channel.

15. A method in a first node for wireless communication, comprising:
monitoring a first-type signaling and a second-type signaling in a first time-frequency resource pool and a second time-frequency resource pool respectively, and receiving a first signaling; and
transmitting a first information block;
wherein the first signaling is used for determining the first information block; the first signaling comprises a first field; when the first signaling is one first-type signaling, a value of the first field in the first signaling is related to a number of the first-type signalings transmitted in the first time-frequency resource pool, and is unrelated to a number of the second-type signalings transmitted in the second time-frequency resource pool; when the first signaling is one second-type signaling, a value of the first field in the first signaling is related to both a number of the first-type signalings transmitted in the first time-frequency resource pool and a number of the second-type signalings transmitted in the second time-frequency resource pool.

16. The method according to claim 15, comprising:
receiving a first bit block set, wherein the first signaling comprises scheduling information of the first bit block set; the first information block indicates whether each bit block in the first bit block set is correctly received;
or, the first signaling is used for indicating a semi-persistent scheduling release, and the first information block indicates whether the first signaling is correctly received.

17. The method according to claim 15, wherein the first signaling is associated to a first index; when a value of the first index is equal to one numerical value in a first numerical value set, the first signaling is one first-type signaling; when a value of the first index is equal to one numerical value in a second numerical value set, the first signaling is one second-type signaling; and any one numerical value in the first numerical value set is not equal to any one numerical value in the second numerical value set.

18. The method according to claim 15, wherein the first information block comprises L information subblocks, L being a positive integer greater than 1; L signalings are one-to-one corresponding to the L information subblocks, the first signaling is one of the L signalings, and the first signaling is corresponding to a first information subblock among the L information subblocks.

19. The method according to claim 18, wherein the L signalings are used for determining L second-type indexes respectively, and all the L second-type indexes have a same value.

20. The method according to claim 15, wherein the first information block is transmitted on a first channel, and the first signaling is used for determining air interface resources occupied by the first channel.

* * * * *